(12) United States Patent
Sharon et al.

(10) Patent No.: US 9,135,155 B2
(45) Date of Patent: Sep. 15, 2015

(54) STORAGE AND RETRIEVAL OF SHAPED DATA

(71) Applicant: SANDISK TECHNOLOGIES INC., Plano, TX (US)

(72) Inventors: Eran Sharon, Rishon Lezion (IL); Idan Alrod, Herzliya (IL); Omer Fainzilber, Even Yehuda (IL); Ariel Navon, Revava (IL)

(73) Assignee: SANDISK TECHNOLOGIES INC., Plano, TX (US)

( * ) Notice: Subject to any disclaimer, the term of this patent is extended or adjusted under 35 U.S.C. 154(b) by 148 days.

(21) Appl. No.: 13/690,275

(22) Filed: Nov. 30, 2012

(65) Prior Publication Data

US 2014/0157086 A1    Jun. 5, 2014

(51) Int. Cl.
| | |
|---|---|
| *G06F 11/10* | (2006.01) |
| *G06F 12/00* | (2006.01) |
| *G06F 11/08* | (2006.01) |
| *G06F 12/02* | (2006.01) |
| *G06F 12/14* | (2006.01) |

(52) U.S. Cl.
CPC ............... *G06F 12/00* (2013.01); *G06F 11/08* (2013.01); *G06F 11/1012* (2013.01); *G06F 12/0246* (2013.01); *G06F 12/14* (2013.01)

(58) Field of Classification Search
CPC .................................................. G06F 11/1068
USPC ........................................ 714/773, 763, 770
See application file for complete search history.

(56) References Cited

U.S. PATENT DOCUMENTS

| | | | |
|---|---|---|---|
| 6,218,968 B1 | 4/2001 | Smeets et al. | |
| 6,826,649 B2 | 11/2004 | Norman | |
| 7,466,575 B2 | 12/2008 | Shalvi et al. | |
| 8,068,380 B2* | 11/2011 | Nasu et al. | 365/230.03 |
| 8,239,734 B1* | 8/2012 | Shalvi | 714/770 |
| 8,694,854 B1* | 4/2014 | Dar et al. | 714/763 |
| 2008/0024437 A1 | 1/2008 | Morooka | |
| 2011/0246859 A1 | 10/2011 | Haratsch et al. | |

FOREIGN PATENT DOCUMENTS

| | | |
|---|---|---|
| WO | 2010039859 A1 | 4/2010 |
| WO | 2010092536 A1 | 8/2010 |
| WO | 2012154255 A1 | 11/2012 |

OTHER PUBLICATIONS

U.S. Appl. No. 13/331,773, filed Dec. 20, 2011, 59 pages.
Xie, Ningde et al. "Using Lossless Data Compression in Data Storage Systems: Not for Saving Space," IEEE Transactions on Computers, vol. 60, No. 3, Mar. 2011, 11 pages.
International Search Report and Written Opinion of the International Searching Authority (EPO) for International Application No. PCT/US2013/071061, mailed May 30, 2014, 13 pages.

* cited by examiner

*Primary Examiner* — Fritz Alphonse
(74) *Attorney, Agent, or Firm* — Toler Law Group, PC

(57) ABSTRACT

Systems and methods of encoding and decoding shaped data include determining a bit representation corresponding to a bit in a representation of a codeword that is read from a non-volatile memory of a data storage device. A soft metric corresponding to the bit representation is determined at least partially based on an amount of shaping of data.

63 Claims, 10 Drawing Sheets

STORAGE AND RETRIEVAL OF SHAPED DATA

FIELD OF THE DISCLOSURE

The present disclosure is generally related to storing and retrieving shaped data.

BACKGROUND

As the number of write/erase (W/E) cycles performed in a flash memory increases, the data retention capability of the flash memory is reduced and the probability of failures is increased. Such failures are usually related to wearing of an oxide isolation layer of cells in the flash memory due to electrons passing through the oxide isolation layer during W/E cycles and generating electron trap sites. Such failures can be manifested in several ways, such as by failing to erase or program a block of cells in the flash memory or by having reduced cell data retention (i.e., a reduced ability to store data reliably for a certain period of time). As cell dimensions shrink, a corresponding reduction in endurance may become a limiting factor affecting commercial viability non-volatile memories, such as NAND-based flash memory.

A data stream with a distribution that is significantly different than a distribution induced by an independent and identically distributed (i.i.d.) bit source having equal probability for 1 and 0 is said to be "shaped." Examples of shaped data include data that contains a significantly higher number of 1-s than 0-s, or vice versa (e.g., data which contains a significantly higher number of 0-s than 1-s). An amount of shaping may correspond to an entropy of a data source that is determined relative to an alphabet of data and its distribution. For example, binary entropy is the entropy of an i.i.d. data source having an alphabet $\{0, 1\}$. Binary entropy can be determined as $H(p)=-p(0)\log_2 p(0)-p(1)\log_2 p(1)$, where $p(0)$ is the probability that the data source will generate the value 0 and $p(1)$ is the probability that the data source will generate the value 1. If the data source has a distribution of 90% 0-s and 10% 1-s, the entropy $H(p)$ is approximately equal to 0.47. As another example, if an i.i.d. data source has an alphabet that contains four symbols $\{A, B, C, D\}$, the entropy of the data source can be determined as $H(p)=-p(A)\log_4 p(A)-p(B)\log_4 p(B)-p(C)\log_4 p(C)-p(D)\log_4 p(D)$. If A, B, C, and D are represented in the data by the ordered pairs (0,0), (0,1), (1,0), and (1,1), respectively, low entropy but equal distributions of 1-s and 0-s may result, such as when $p(0,0)=p(1,1)=0.05$ and $p(1,0)=p(0,1)=0.45$.

Any data with entropy significantly lower than one (where one is the binary entropy of data having 50% zeros and 50% ones) can be considered to be shaped. Criteria for considering a value of entropy to be significantly lower than '1' may vary according to each particular implementation. Shaped data may have a higher number of 1-s because in conventional NAND flash systems, '1' typically represents an erase state while '0' typically represents a programmed state. Shaping data to have a higher number of 1-s may increase a useful life of a flash memory because increasing the proportion of memory cells that are set to the erase state (i.e., cells set to logical '1") causes less wear of the flash cells and increases the number of W/E cycles that the NAND flash cells may undergo while maintaining a pre-defined storage reliability.

In multi-level cell (MLC) devices in which programming is used in order to store reliable data, any data stored in the MLC cells may be first placed in a single-level cell (SLC) cache. A partition of the flash memory that is most susceptible to wearing may be a SLC partition that includes the SLC cache.

The SLC cache may be a binary partition of a flash memory die. Conventionally, each cell in the SLC cache stores only one bit and has only two distinct voltage regions that are separated. In many cases, data can be reliably programmed to the SLC partition in a direct, simple, and speedy manner, while programming the data into the MLC partition is a more complex and slower process. Another useful characteristic of the SLC partition is that it is possible to program the SLC partition in smaller data size chunks. For example, when storing a 16 kilobyte (KB) page, data may be programmed to a SLC cache in chunks of 4 KB, while for MLC programming the smallest data size chunk that can be programmed may be 16 KB.

With increasing use of "random" (i.e., non-sequential) type of programming of memory devices, such as solid state drives, data is typically first programmed to a SLC cache. As a result, in MLC NAND flash devices, a limiting factor of a useful life of a flash based system may be the endurance of the SLC partition.

Data may be first stored temporarily in an SLC partition and later moved to a MLC partition for long term storage. The SLC partition is typically much smaller than the MLC partition. Therefore, the SLC partition may be subject to higher wearing pressure, since most of the data targeted to the MLC partition passes for a short period through the SLC partition (i.e., first stored at the SLC and then copied to the MLC). In many cases, wearing of the SLC partition may be the factor that limits the useful life of a flash memory system. Extending life of the SLC partition may therefore extend the useful life of the flash memory system. Various methods may be used to shape compressible data to form shaped data, such that the portion of 1-s in the shaped data is larger than the portion of 0-s. Because '1' typically corresponds to the Erase state in a SLC partition, the SLC partition may experience less wear when programmed with shaped data.

Decoding shaped data using conventional soft decode techniques that include estimating an initial reliability for each bit (such as a log-likelihood ratio (LLR)) that is independent of the shaping level of the data results in non-optimal decoding and reduced correction capability compared to theoretically achievable correction capability. Another issue is related to a problem that may arise when programming shaped data into a MLC partition. Shaped data stored in a MLC partition may result in unbalanced bit error rates (BER) between different logical pages of the MLC partition, and thus one of the logical pages may incur higher bit error rate. A problem may arise when copying the shaped data from the SLC cache to the MLC partition causing an increase in the MLC error rate of one or more of the MLC logical pages due to unbalanced bit error rates (BER) between different logical pages of the MLC WordLine (WL). Thus, shaping methods that may help solve the problem of the wear of the SLC cache at the same time may increase the error rate of the data stored in MLC. It is desired to have a shaping mechanism which enhances the SLC endurance on one hand, while on the other hand does not increase the MLC error rate. Moreover, it is desired to have mechanism that improves the correction capability for the MLC data.

Increased error rate due to unbalanced block error rates resulting from storing shaped data may be at least partially compensated by the use of additional soft bits during decoding of data read from a MLC partition, that can boost the decoder's correction capability. However, reading additional soft bits impacts read throughput performance and power consumption. Reading additional soft bits from a flash memory includes sensing the flash memory with additional read threshold voltages. A total number of sensing operations to read the soft bits may be a factor of 3 to 7 higher than a number of sensing operations for reading the hard bits only, resulting in increased power consumption and lower throughput.

SUMMARY

The present disclosure describes improved decoding methods for shaped data that provide higher error correction capability for shaped data. Disclosed methods enable use of statistics corresponding to shaped data to improve decoding of the shaped data at a soft decoder. For example, the statistics may be collected during data shaping and encoding or may be collected upon receipt of the shaped data at the soft decoder. The statistics may be used to generate correction values for soft metrics that are used by the soft decoder during decoding of the shaped data. As a result, the soft decoder may operate using more accurate initial reliability estimates of the shaped data, enabling improved error correction capability, faster decode time, and/or reduced power consumption.

Use of shaping statistics to generate soft bit correction values may be implemented in a data storage device such as a flash memory device. Improved error correction capability may be used to improve data retention by enabling correction of a greater number of errors that may occur over a longer storage time of the shaped data. In some implementations, data retrieval latency of the data storage device may be improved by reducing an amount of time required to read the shaped data from memory and/or by reducing a decoding time of the retrieved shaped data. Alternatively, or in addition, data write latency may be improved by relaxing an amount of accuracy required when writing data to the flash memory without exceeding a threshold error rate.

DETAILED DESCRIPTION

Examples of shaped data in the present disclosure are provided having a number of 1-s in the shaped data that is significantly higher than the number of 0-s. However, embodiments of the present disclosure are applicable to any source of shaped data, such as sources of shaped data that generate shaped data having a higher number of 0-s than 1-s or sources of shaped data having entropy significantly lower than one. The present disclosure also applies to non-binary shaped sources, e.g., sources with an alphabet larger than 2.

Figure 1:
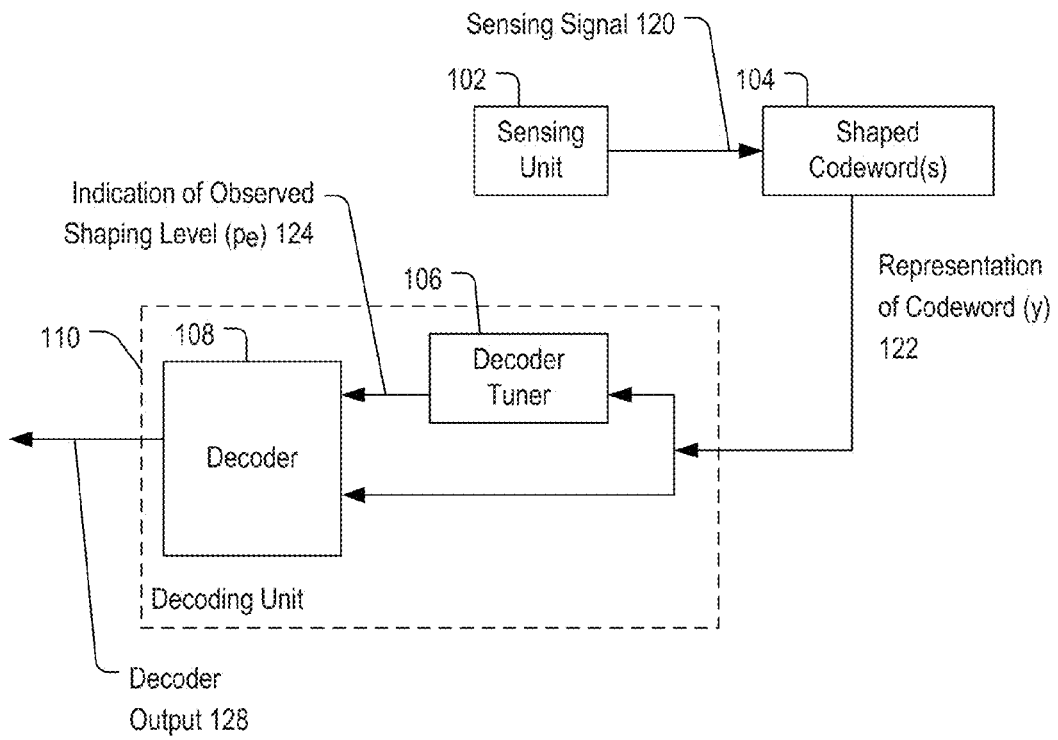
FIG. 1 is a block diagram illustrating a particular embodiment of a system to decode shaped data based on a shaping level of the data.

FIG. 1 depicts a first embodiment of the present disclosure including a decoding unit 110 that includes a decoder tuner 106 that provides to a decoder 108 an indication 124 of an observed shaping level ($p_e$) of received data for use during decoding.

A sensing unit 102 sends a sensing signal 120 to a source 104 of shaped data codewords (e.g., an MLC flash memory array). A representation (y) of a codeword 122 is generated at the output of the source 104 in response to the sensing signal 120. The representation of the codeword 122 is received by the decoding unit 110 (e.g., a decoding unit inside a flash controller). The decoding unit 110 includes the decoder tuner 106 and a soft decoder 108 (for example, a low-density parity check (LDPC) decoder).

The decoder tuner 106 is configured to measure a shaping level of data received from the source 104, such as by counting '1' values in incoming data, and provides the indication of the observed shaping level ($p_e$) 124 to the decoder 108. For example, the indication of the observed shaping level $p_e$ 124 may represent a ratio of a count of 1 values of data received at the decoder tuner 106 as compared to total count of values of the data.

The decoder 108 is configured to generate initial reliability estimates of values in the representation of the codeword 122 based at least partially on the indication of the observed shaping level ($p_e$) 124. For example, the decoder 108 may generate a log likelihood ratio (LLR) for each value of the representation of the codeword 122 and initiate decoding using the LLRs. Generation of the LLRs may be based on the indication of the observed shaping level ($p_e$) 124. A result of decoding using the initial reliability estimates (e.g., LLRs) is provided as a decoder output 128.

Figure 2:
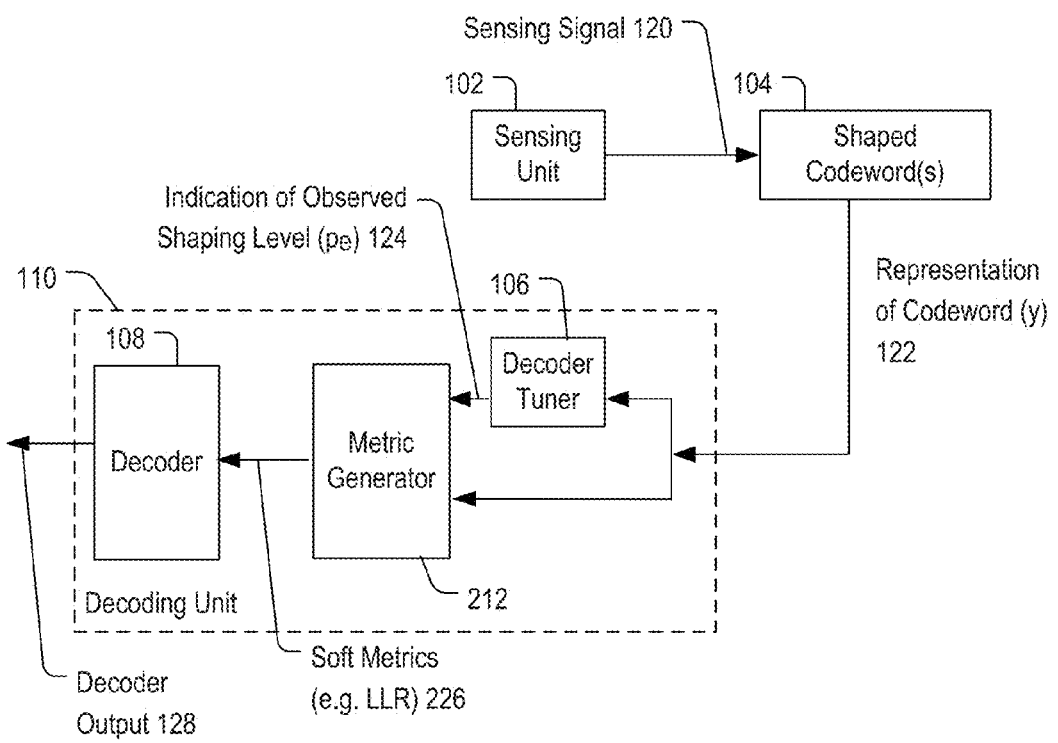
FIG. 2 is a block diagram of another embodiment of a system to decode shaped data based on a shaping level of the data.

By generating initial reliability values that are at least partially based on the indication of the observed shaping level ($p_e$) 124, an error correction capability of the shaped data may be increased as compared to using initial reliability values that are generated based on unshaped data, as described in further detail with respect to FIG. 2.

FIG. 2 depicts another embodiment that includes the sensing unit 102, the source 104, and the decoding unit 110 including the decoder tuner 106 and the decoder 108 of FIG. 1. The decoding unit 110 also includes a metric generator 212 coupled to receive the indication of the observed shaping level ($p_e$) 124 from the decoder tuner 106 and to provide soft metrics (e.g., LLR values) 226 to the decoder 108.

In an embodiment where the decoding unit 110 is implemented in a flash memory device, the decoder tuner 106 is configured to measure a shaping level (e.g., based on a fraction of 1's in an ECC block, such as in the representation of the codeword 122). A measured shaping level ($p_e$) and the read value of a cell of flash memory (e.g., one or more bits of y), which may correspond to a combination of hard and soft values read from the cell, are both used by the metric generator 212 in order to compute LLR estimates for the bits stored in the cell. For example, the LLR for a bit b may be computed as follows: LLR(b)=F(y, M)+C(p), where:

1) F(y,M)=log(Pr(y|b=0)/Pr(y|b=1) is the LLR of bit b assuming no shaping, which is a function of the statistical model M, describing the "noises" of the cell. This statistical model is a function of the "noise" level or bit error rate of the Flash cells. However, during read this bit error rate may be unknown (for example, the bit error rate can depend on cycling, an amount of time that elapsed sense cell was programmed, temperature variations, cell physical parameters, etc.) and may instead be estimated. As an example the bit error rate may be estimated to be the maximal bit error rate that the decoder 108 can correct. However, the maximal bit error rate that the decoder 108 can correct is a function of the actual shaping level p. The actual shaping level p may be estimated from the measured shaping level $p_e$. Hence, F(y,M) may be a function of y and of $p_e$.

2) C(p)=log((1−p)/p), where p is the probability of b to be 1, can be used as a correction term due to the shaping. However, p may be unknown during reading and hence may be estimated. An estimation of p may generated by counting the number of 1's in the ECC block, such that p=$p_e$=(number of 1's in the ECC block)/(total number of bits in the ECC block). However, this estimation may be biased due to bit errors introduced by the Flash, as the measured shaping level $p_e$ is given by $p_e$=p·(1−BER)+(1−p)·BER, where BER is the bit error rate introduced by Flash. Hence, the actual shaping level p may be estimated as $$p = \frac{p_e - BER}{1 - 2BER}.$$

The BER may be estimated using various conventional methods.

Since the LLR calculation may depend on the BER, which may be unknown, an iterative procedure may be used where the BER is estimated as part of decoding and used to re-estimate the a-priori LLRs, which are then used to re-estimate the BER, which is used to re-estimate the a-priori LLRs and so on. This implementation may be performed by the system of FIG. 1, where the decoder tuner 106 provides an indication of the measured shaping level $p_e$ 124 and the decoder 108 uses the read values y and $p_e$ in order to decode the codeword. In this case, a metric generator (such as the metric generator 212 of FIG. 2) may be internal to the decoder 106. The a-priori LLRs computed by the metric generator may be repeatedly updated as part of the decoding process, as the BER estimation may repeatedly change as decoding progresses and the shaping level estimation may repeatedly change as the decoding progresses.

In contrast to FIG. 1, in the embodiment illustrated in FIG. 2 a-priori LLRs are computed as a function of the read values (y) and of a measured shaping level ($p_e$) provided by the decoder tuner (i.e., LLR(b)=function(y, $p_e$)). Then these a-priori LLRs are used for decoder initialization.

In some implementations, a-priori LLRs may be determined via one or more tables of LLR values. For example, multiple LLR tables may be stored corresponding to different ranges of p, such as a first table for values of p from 0.5 to 0.75, a second table for values of p greater than 0.75 and less than or equal to 0.9, and a third table for values of p greater than 0.9. For example, F(y, $p_e$) may be determined by selecting a particular LLR table that corresponds to the observed shaping level $p_e$ (or that corresponds to an estimate of the actual shaping level p). An estimate of the actual shaping level p may be determined as described below.

Figure 3:
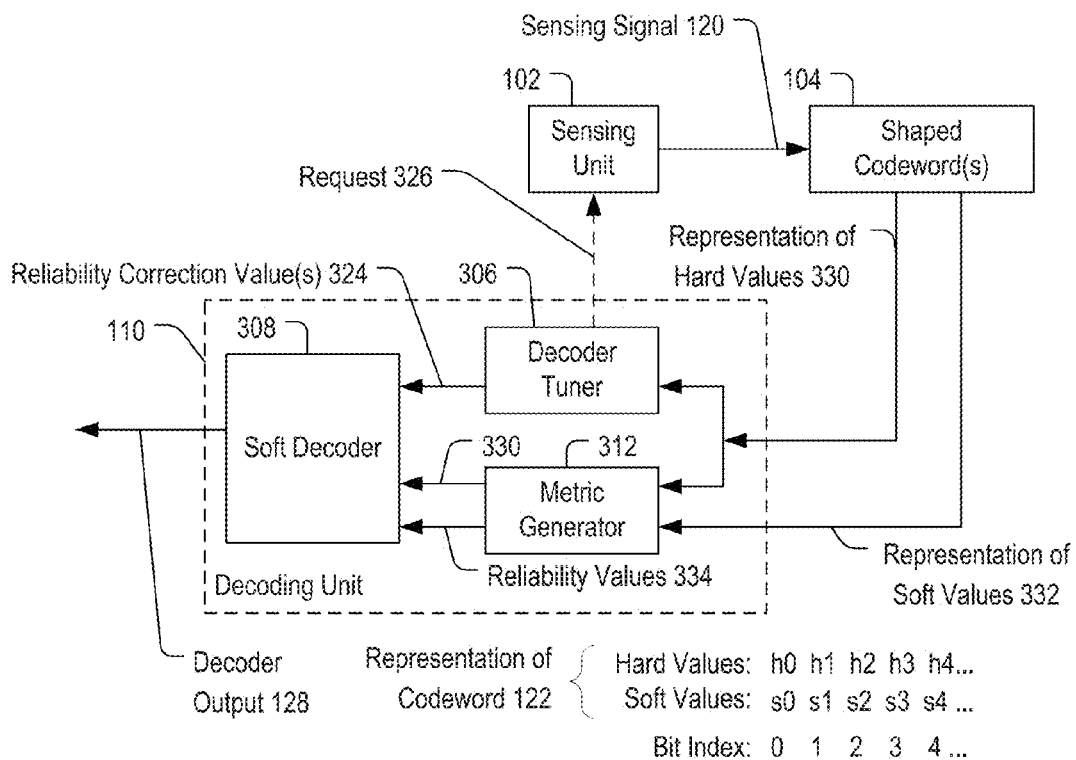
FIG. 3 is a block diagram illustrating a particular embodiment of a system to apply correction values to adjust reliability values of shaped data prior to decoding the shaped data.

FIG. 3 shows another implementation that may be less complex than the embodiments of FIGS. 1-2, but may provide reduced correction capability as compared to the embodiments of FIGS. 1-2. In the embodiment of FIG. 3, a decoder tuner 306 measures a shaping level ($p_e$) and uses the measured shaping level to compute and output an indication of the LLR correction term (C(p)), where p may be estimated as a function of $p_e$. A metric generator 312 computes the unshaped LLR F(y,M), where the statistical model M assumes a fixed noise level or bit error rate and is not a function of a measured shaping level $p_e$. The two LLR terms (i.e., the unshaped LLR and the LLR correction term) are summed in a soft decoder 308 to provide the a-priori LLR to initialize the decoder 308.

In this case, F(y,M) may be computed by the metric generator 312 as a function of y and independently of a measured shaping level $p_e$, while C(p) may be computed by the decoder tuner 306 as a function of a measured shaping level $p_e$. Summarizing in an equation, $$LLR(b) = \underbrace{F(y, M)}_{\text{From Metric Generator}} + \underbrace{C(p)}_{\text{From Decoder Tuner}}$$

As illustrated in FIG. 3, the decoding unit 110 includes the decoder tuner 306 that uses correction values to correct reliability values of a shaped codeword based on the amount of shaping.

The sensing unit 102 sends the sensing signal 120 to the source 104 of shaped data codewords (e.g., an MLC flash memory array). The representation of a codeword 122 is generated at the output of the source 104 in response to the sensing signal 120. The representation of the codeword 122 includes a representation of hard bit values 330 (representing the content of the codeword 122) and optionally also includes a representation of soft values 332 that are additional bit values, also known as soft bits or resolution bits. The representation of the codeword 122 is received by the decoding unit 110 (e.g., a decoding unit inside a flash controller). The decoding unit 110 includes the decoder tuner 306, the metric generator 312, and the soft decoder 308 (for example, a low-density parity check (LDPC) decoder).

The representation of the codeword 122 may be converted to soft metrics by the metric generator 312. For example, the metric generator 312 may generate initial reliability values 134 based on the representation of hard bit values 330 and the representation of soft bit values 332. The reliability values 334 may indicate, for each value of the representation of the hard values 330, an estimated likelihood or probability that hard value is correct. The soft metrics generated at the metric generator 312 may be provided to the soft decoder 308 as the representation of the hard values 330 and the reliability values 334. Although the soft metrics are described as separate hard values 330 and reliability values 334 for clarity of explanation, the soft metrics may be in a form that combines the hard values 330 and the reliability values 334, such as Log Likelihood Ratio (LLR) values.

The representation of hard values 330 may also be provided to the decoder tuner 306, where reliability correction values 324 are determined. For example, the reliability correction values 324 may include a second initial reliability value assigned to each hard value in the representation of hard values 330. The reliability correction values 324 may be determined at least in part based on statistics corresponding to an amount of shaping of the received data. The reliability correction values 324 are provided to the soft decoder 308.

During operation, the soft decoder 308 may choose to decode using the first set of initial reliabilities (i.e., the reliability values 334 from the metric generator 312) or the second set of initial reliabilities (i.e., the reliability correction values 324 from the decoder tuner 306). For example, the soft decoder 308 may replace the received reliability values 334 with the reliability correction values 324 for use as initial reliability estimates and may generate the decoder output 128. The decoder output 128 may include an error corrected version of the hard values and may include decoding information such as a number of errors that were corrected during decoding.

As illustrated, the representation of the codeword 122 includes, for each bit index, a hard value and a soft value. The hard value indicates a bit value for the bit index (e.g., in a binary encoding scheme, the hard value may indicate a logical '0' value or a logical '1' value) and the soft value corresponds to additional information regarding the representation of the bit values. For example the soft bits may include the results from reading a memory with a higher resolution than the resolution required for hard bits alone. The hard and soft bits may be used to generate a soft metric, in the form of a reliability value that indicates an estimate of a reliability of the hard value. To illustrate, in an LLR implementation, an LLR value for each bit index may include a sign and a magnitude, where the hard value is represented by the sign and the reliability is represented by the magnitude.

The correction values 324 are provided to the soft input decoder 108 to enhance a correction capability of the soft input decoder 308. The decoder tuner 306 may generate the correction values based on an amount of shaping of data in the source 104. For example, the decoder tuner 306 may compute the correction values 324 based on computing an entropy or computing relative proportions of 1-s and 0-s in the representation of the codeword 122. In some implementations, computation of the correction values 324 may be performed globally (i.e., including all codewords received from the source 104). In other implementations, computation of the correction values 324 may be performed within a window (such as an overlapping sliding window or non-overlapping windows) and the correction values 324 are dynamically adjusted corresponding to the amount of shaping within the window. In other implementations, the decoder tuner 306 may receive information indicating the amount of shaping as side information rather than compute the proportion at the decoder tuner 306.

As an example, an LLR value for an i-th bit may be expressed as $$LLR_i = \log_2\left(\frac{Pr\{bit_i = 0 \mid \underline{y}\}}{Pr\{bit_i = 1 \mid \underline{y}\}}\right)$$

-continued $$= \log_2\left(\frac{Pr\{\underline{y} \mid bit_i = 0\} \cdot Pr\{bit_i = 0\}}{Pr\{\underline{y} \mid bit_i = 1\} \cdot Pr\{bit_i = 1\}}\right) =$$

$$= \log_2\left(\frac{Pr\{\underline{y} \mid bit_i = 0\}}{Pr\{\underline{y} \mid bit_i = 1\}}\right) + \log_2\left(\frac{Pr\{bit_i = 0\}}{Pr\{bit_i = 1\}}\right) =$$

$$= \underbrace{\log_2\left(\frac{Pr\{\underline{y} \mid bit_i = 0\}}{Pr\{\underline{y} \mid bit_i = 1\}}\right)}_{\text{Taken from LLR table}} + \underbrace{\log_2\left(\frac{1-p}{p}\right)}_{\substack{\text{Correction term} \\ \text{determined by the} \\ \text{probability of one}}}$$

where $\underline{y}$ indicates a read bit value (e.g., a read value of the i-th bit in the representation of the codeword 122, that may correspond to both hard value and soft value), $Pr\{\underline{y}|bit_i=0\}$ is a probability that $\underline{y}$ is read when the original value of the i-th bit of the codeword is zero, and p is a probability that a bit in the codeword has a one value (e.g., p may be estimated by counting 1-s in the representation of the codeword 122).

The first term of $LLR_i$ corresponds to an a-priori value that may be computed based on a statistical model or retrieved from a precomputed table of LLR values. The second term of $LLR_i$ corresponds to a correction due to an uneven distribution of 1-s and 0-s and may be generated by the decoder tuner 106 to determine the correction values 324.

Figure 6:
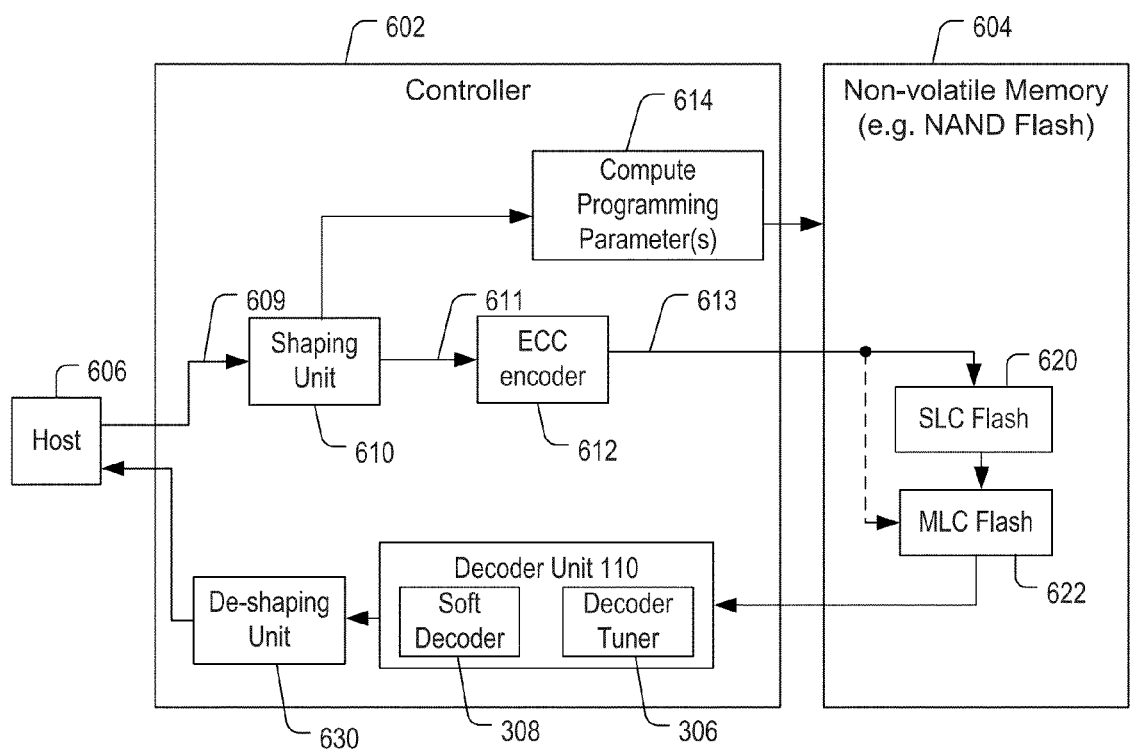
FIG. 6 is a block diagram of a particular embodiment of a system including a data storage device that implements the system of any of FIGS. 1-4.

Another option for implementation is for the decoder tuner 306 to compute an estimated correction capability of the decoder 308. If the estimated correction capability of the decoder 308 does not match a required correction capability of the decoder 308, the decoder tuner 306 may send a request 326 to the sensing unit 102 to sense incoming bits with additional resolution (soft bits). The correction capability of the decoder 308 may be estimated as a function of one or more of amount of shaping (e.g., the distribution of 1-s and 0-s) in the received representation of the codeword 122, the number of errors at the decoder output 128 for preceding codewords, or the number of write/erase cycles experienced by a flash memory storing the shaped codewords (in implementations where the decoder 308 is a decoder for a flash memory system, such as depicted in FIG. 6). Further, any subset of these parameters (i.e., amount of shaping, distribution of 1-s and 0-s, error count of prior codewords, and/or W/E cycles) may be used to estimate the correction capability of the decoder 308, and one or more other parameters may be used in addition to or in place of one or more of these parameters.

Figure 4:
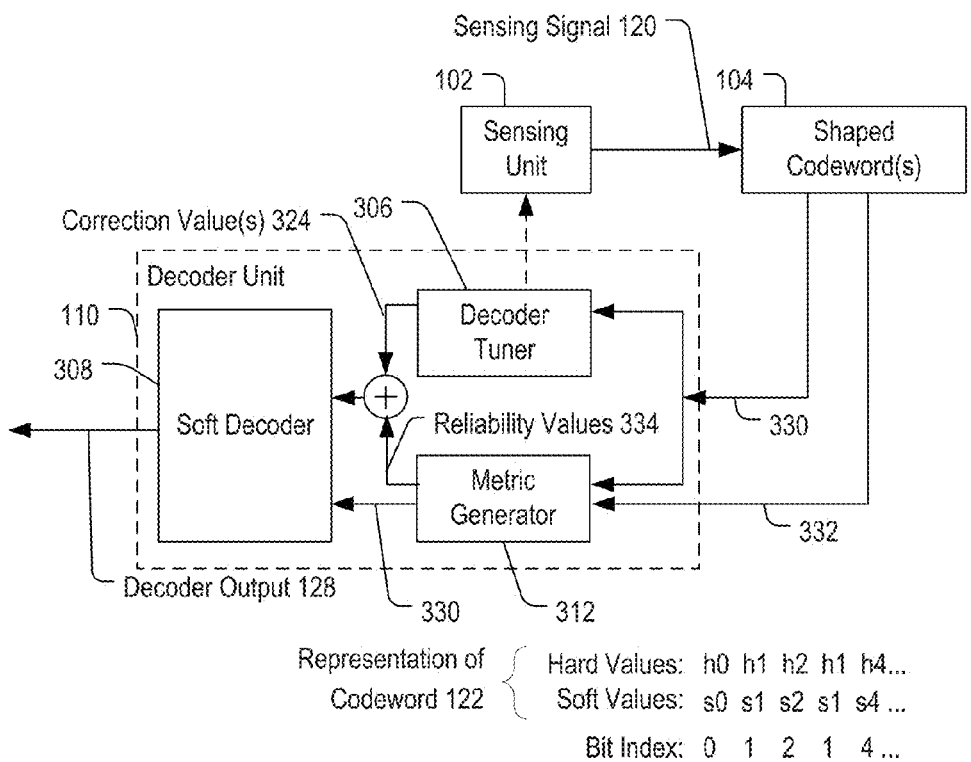
FIG. 4 is a block diagram of another embodiment of a system to apply correction values to adjust reliability values of shaped data prior to decoding the shaped data.

FIG. 4 illustrates the system of FIG. 3 and further includes an adder having a first input that receives the at least a portion of the soft metrics (illustrated as the reliability values 334) and having a second input that receives the correction values 324. The adder is configured to generate initial soft metrics for use by the soft decoder 308 by applying the correction values 324 to corresponding values of the soft metrics from the metric generator 312 and to provide the initial soft metrics to an input of the soft decoder 308.

Although FIG. 4 illustrates the representation of the hard values 130 as being provided directly to the soft decoder 308 and the reliability values 334 being modified by the correction values 324, in some implementations the representation of the hard values 330 and the reliability values 334 may form a combined soft metric that is provided to the adder, such as a log likelihood ratio (LLR). For example, if the LLR associated with a certain bit is '+3' and the a-priori probability for '1' is 95% then the decoder tuner 306 may output a correction value of −4. The value of −4 may be added to +3, resulting in a modified LLR of −1 fed to the soft decoder 308. In this example, the hard bit value is flipped (e.g., from a "0" value (associated with a positive LLR) to a "1" value (associated with a negative LLR)) by applying the correction value from the decoder tuner 306.

Although FIGS. 3-4 illustrate the decoder tuner 306 determining the correction values 324 based on an amount of shaping and the representation of hard values 330, in other implementations the decoder tuner 306 may also receive the representation of soft values 332. For example, the decoder tuner 106 may generate the correction values 324 at least partially based on additional resolution provided by the soft values. As a result, the correction values 324 may have improved accuracy as compared to implementations where the soft values are not used in determining the correction values 324.

Figure 5:
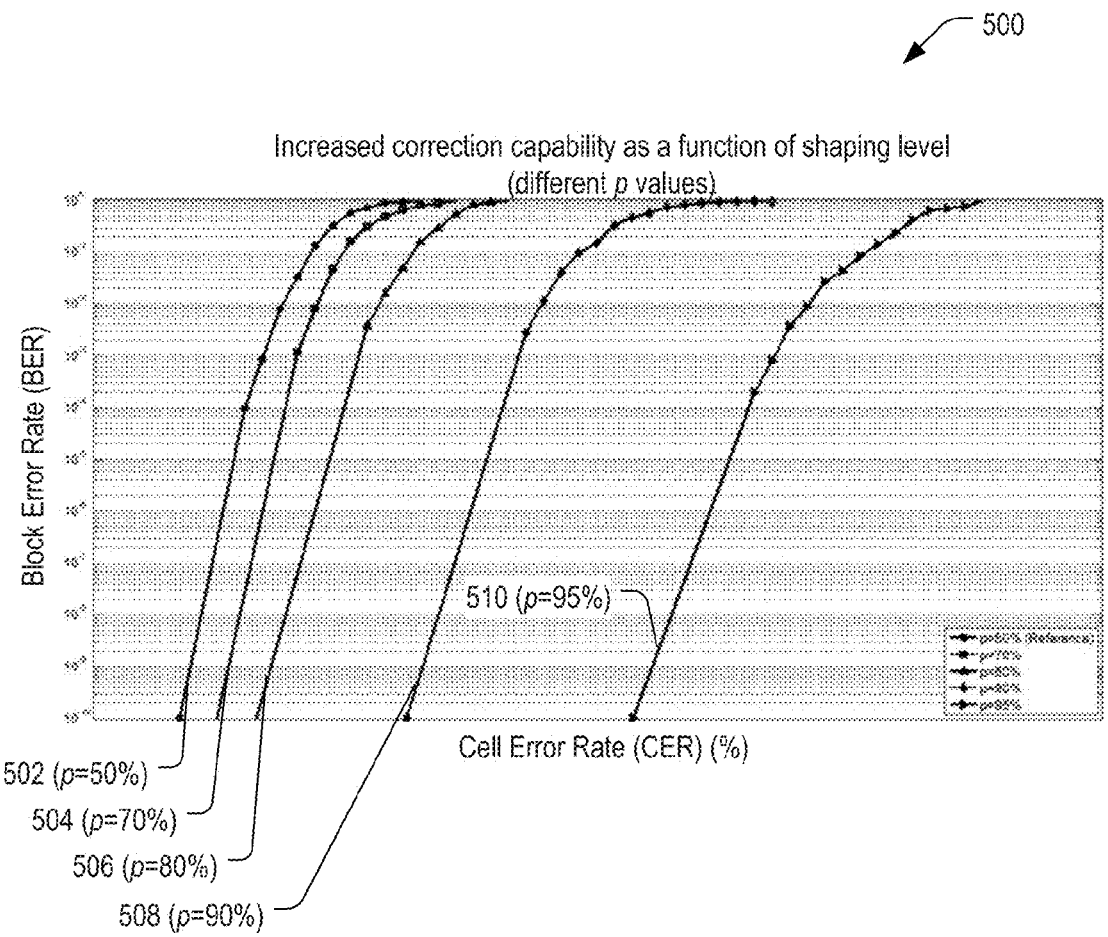
FIG. 5 is a general diagram illustrating block error rates of an MLC page due to a shaping of data and further illustrating an example of block error rates resulting generating soft metrics based on shaping level.

A correction capability gain resulting from applying the correction values 324, as in FIG. 3 or FIG. 4, is illustrated in FIG. 5. A graph 500 illustrates improvement in the error correction capability of a decoder (e.g., the soft decoder 308 of FIGS. 3-4) due to the correction values 324 provided by the decoder tuner 306 of FIG. 3 for various proportions of 1-s, including a first curve 502 of i.i.d. data with p=50%, (i.e., 50% 1-s), a second curve 504 of i.i.d. data with p=70%, a third curve 506 of i.i.d. data with p=80%, a fourth curve 508 of i.i.d. data with p=90%, and a fifth curve 510 of i.i.d. data with p=95%. The correction capability improvements illustrated in the graph 500 may provide correction capability superior to the correction capability of a decoder operating on unshaped i.i.d. data (i.e., p=50%).

The increased error correction capability for shaped data, illustrated in the graph 500, may be utilized for improving read performance and power. This may be achieved with a hard bit reading only while avoiding soft bit read operations (and the additional delay to perform soft bit read operations). To illustrate, in some implementations of the system of FIG. 3 or FIG. 4, the representation of the soft values 332 may not be determined and only the representation of the hard values 330 may be sensed from the source 104 of shaped codewords. The metric generator 312, in the absence of soft bits or additional resolution bits, may generate default values of the initial reliability values 334 (e.g., all 0 values). The decoder tuner 306 may generate the correction values 324 to provide more accurate initial soft metrics to the soft decoder 308 based on the shaping statistics (e.g., based on an observed p value) of the received data. In a flash memory implementation, improved correction capability of shaped data may be attained while avoiding a delay and increased power consumption associated with additional sensing operations to obtain soft bit values.

By providing the above decoding performance improvements while avoiding a delay associated with performing soft bit read operations, read throughput may be increased as compared to systems that perform soft bit read operations. As a result, the decoder tuner 306 of FIG. 3 and FIG. 4 enables an additional correction capability for decoding shaped data, and the additional correction capability is used in the system of FIG. 3 and FIG. 4 to reduce read latency as compared to systems that read soft bits to attain similar decoding performance. Read latency is reduced even compared to systems that do not read soft bits, as the decoding time is expected to be lower when the error correction capability is higher. For example, for a given input BER from the Flash, as the ECC correction capability becomes higher, the decoding latency is expected to be lower. This is especially true for iterative coding systems.

A second embodiment of the present disclosure includes utilizing shaping information to improve a programming performance of a flash memory. Improving the programming performance may be achieved by using a larger programming step size, resulting in less accurate programmed voltage levels in the flash memory and a reduced programming time as compared to using a smaller programming step size. For example, the system depicted in FIG. 3 or FIG. 4 may be modified to implement the second embodiment by including in the source 104 a MLC flash memory programmed using larger programming steps that result in less accurate programmed voltage levels. An increase of the raw error rate at the representation of the codeword 122 (e.g., a loss in accuracy due to the larger programming step size) as compared to a more accurate representation of the codeword 122 which would have been achieved had the flash memory been programmed using smaller programming step size may be compensated by the higher correction capability of the decoder 308 due to the correction values 324 computed by decoder tuner 306. Optionally, improving the programming performance may be achieved by using an optimal programming step size.

The graph 500 of FIG. 5 may be used to compute a Cell Error Rate (CER) or a Bit Error Rate (BER) that the system of FIG. 3 may accommodate and achieve a Block Error Rate (BLER) less than a predefined BLER. The computed CER will typically be a function of the amount of shaping of the input data, (e.g., the percentage of '1'-s in the input data). A programming step size (e.g., an optimal or near-optimal programming step size) may be computed as a function of the computed CER, such that the CER for flash memories programmed with the computed programming step size will not exceed the computed CER.

The system depicted in FIG. 3 or FIG. 4 may be modified to implement the optional second embodiment by including in the source 104 a MLC flash memory programmed using the computed programming step that result in CER which is less than the maximal CER that can be tolerated by the decoder 308 and still achieve the required BLER performance. If the program step size is set such that the CER associated with the programming step size is equal (or close to) the computed CER, then the system will operate in a mode where the write throughput will be the maximal write throughput allowed while achieving the required BLER. For example, if the shaping of the input data is 80% '1'-s and the BLER is required to be lower than $10^{-8}$ then a first CER may be determined such as by reference to a model or table storing values of the curve 506 of FIG. 5. A programming step size achieving the first CER may be computed and the programming step size may be set to the computed programming step size. Considering a different example, if the shaping of the input data is 95% '1'-s with the same BLER requirements then according to the curve 510 of FIG. 5 a second CER that can be tolerated by the system may be increased as compared to the first CER based on the curve 506. A programming step size achieving the second CER may be computed and the programming step size may be set to the computed programming step size.

Note that this implementation is flexible and the performance of the system may be easily adapted to changing shaping characteristics of the input data. For example, if the shaping of the incoming data increases from a previous shaping level the programming step size may be increased, and if the shaping decreases from a previous shaping level the programming step size may be decreased, thus always allowing for enhanced performance.

FIG. 6 depicts a system including a host device 606 coupled to a data storage device that implements the system of FIG. 3 or the system of FIG. 4. The host device 606 may be configured to provide data 609 to be stored at a memory 604 of the data storage device or to request data to be read from the memory 604. For example, the host device 606 may include a mobile telephone, a music or video player, a gaming console, an electronic book reader, a personal digital assistant (PDA), a computer, such as a laptop computer, a notebook computer, or a tablet computer, any other electronic device, or any combination thereof.

The data storage device includes the memory 604 coupled to a controller 602. The memory 604 may be a non-volatile memory, such as a NAND flash memory. The memory 604 includes an SLC partition 620 that includes an SLC cache and an MLC partition 622. For example, the data storage device may be a memory card, such as a Secure Digital SD® card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). As another example, the data storage device may be configured to be coupled to the host device 406 as embedded memory, such as eMMC® (trademark of JEDEC Solid State Technology Association, Arlington, Va.) and eSD, as illustrative examples.

The controller 602 is configured to receive data and instructions from and to send data to the host device 606 while the data storage device is operatively coupled to the host device 606. The controller 602 is further configured to send data and commands to the memory 604 and to receive data from the memory 604. For example, the controller 602 is configured to send data and a write command to instruct the memory 604 to store the data to a specified address. In response, the memory 604 is configured to store the data to the MLC partition 622 (illustrated as a dashed line bypassing the SLC partition 620). Alternatively, in response to a write command, the memory 604 is configured to store the data to the SLC partition 620. Data may later be copied from the SLC partition 620 to the MLC partition 622. Copying the data from the SLC partition 620 to the MLC partition 622 may be done using an on-chip copy operation within the non-volatile memory 604 without passing the copied data through the controller 602, or it may be done using an off-chip copy operation where the data is copied from the SLC partition 620 to the MLC partition 622 by passing the data through the controller 602 (usually correcting errors in the data using the ECC decoding unit of the controller as part of the copy operation). As another example, the controller 602 is configured to send a read command to read data from a specified address of the memory 604. In response, the memory 604 may be configured to provide a representation of the data from the SLC partition 620 or from the MLC partition 622.

The controller 602 includes a shaping unit 610 and an ECC encoder 612. The shaping unit 610 may be configured to generate shaped data 611 that has a higher proportion of 1-s than in the input data 609. The ECC encoder 612 is configured to receive the shaped data 611 to be stored to the memory 604 and to generate encoded data 613 (e.g., a codeword). For example, the ECC encoder 612 may include an encoder configured to encode data using an ECC encoding scheme, such as a low-density parity check (LDPC) encoder, a Turbo Code encoder, an encoder configured to encode one or more other ECC encoding schemes, or any combination thereof.

The controller 602 includes a programming parameter(s) computation engine 614. The programming parameter(s) computation engine 614 may be configured to receive shaping statistics from the shaping unit 610 and to determine one or more programming parameters to be used when programming the encoded data 613 to the non-volatile memory 604. For example, the programming parameter(s) computation engine 614 may be configured to determine a series of programming pulses, one or more programming step sizes, one or more verify levels, one or more other programming parameters, or any combination thereof, based on an amount of shaping that has been performed on data to be stored to the non-volatile memory 604. The programming parameters may be determined to decrease write latency (e.g., by selecting a larger programming step size), to improve a balance between error rates among logical pages (as described with respect to FIG. 7), to achieve one or more other criteria, or any combination thereof.

Figure 8:
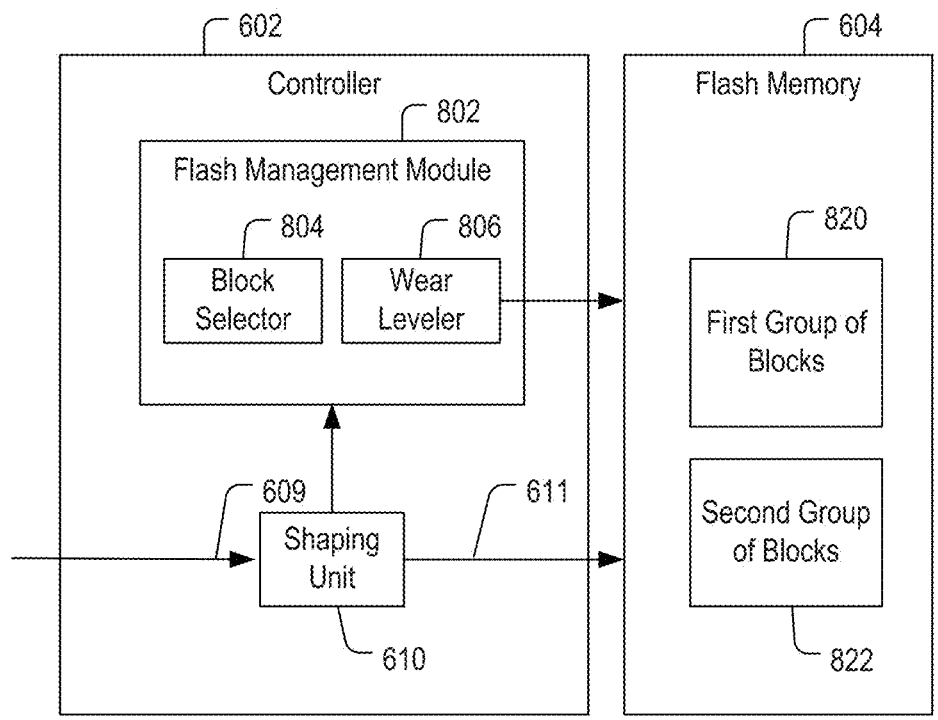
FIG. 8 is a block diagram of a particular embodiment of a data storage device to perform memory management based on a shaping level of data.

The controller 602 may include a flash management module configured to determine destinations of data or other functions (such as wear-leveling) in the non-volatile memory 604 based on an amount of shaping of the data, such as described in further detail with respect to FIG. 8.

The controller 602 also includes the decoder unit 110 of FIG. 3-4 (including the decoder tuner 306 of FIG. 3 and the soft decoder 308 of FIG. 3) and a de-shaping unit 630. The decoder tuner 306 is configured to receive data read from the memory 604 and to output correction values to soft metrics based on the amount of shaping of the data as applied by the shaping unit 610 or as read from the memory 604. The soft decoder 308 is configured to decode data read from the memory 604 using adjusted initial soft metrics based on an output of the decoder tuner 306 to detect and correct, up to an error correction capability of the ECC scheme used to encode the data, any bit errors that may be present in the data. The de-shaping unit 630 receives the decoded data from the soft decoder 308 and applies a de-shaping operation (e.g., performs an inverse of the shaping applied by the shaping unit 610). An output of the de-shaping unit 630 may be provided to the host device 606.

Figure 7:
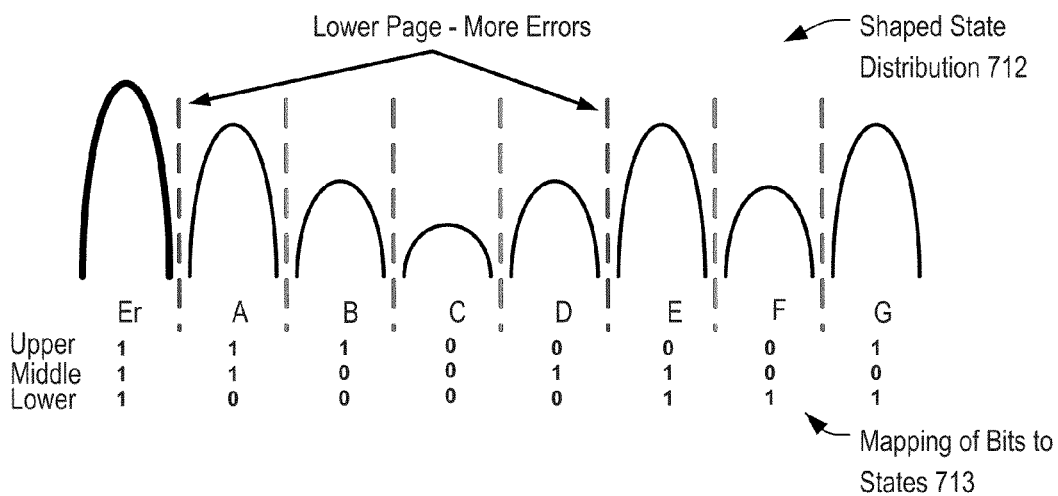
FIG. 7 is a general diagram illustrating an example non-uniform distribution of states of an MLC partition due to data shaping and a particular embodiment of a data storage device that includes a scrambler to scramble shaped data during a data copy from an SLC partition to an MLC partition that may implement the system of any of FIGS. 1-4.
Figure 7:
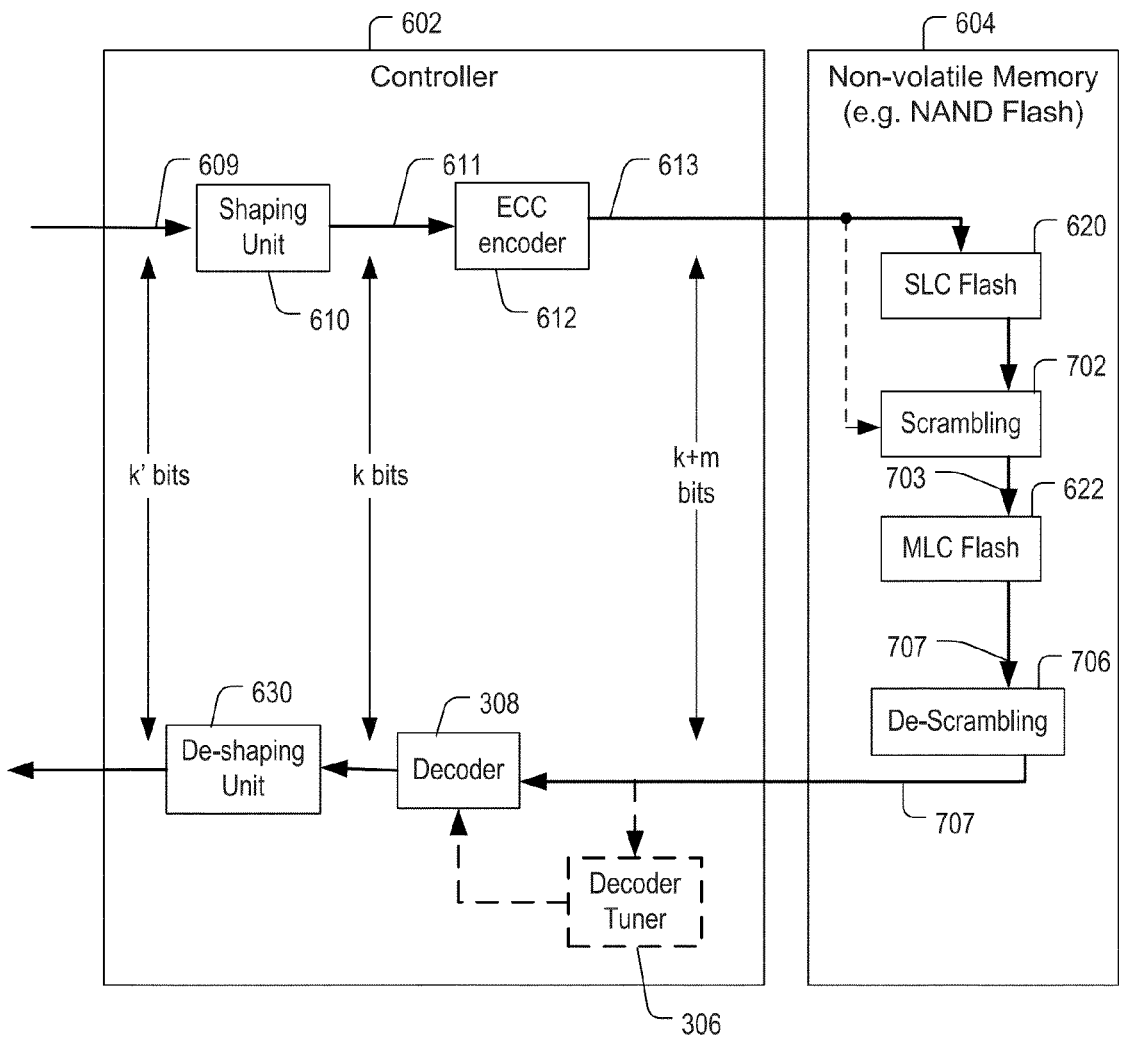

FIG. 7 illustrates an example of a non-uniform distribution of states 712 resulting from storing shaped data in a three bit-per-cell (3-BPC) MLC partition, a corresponding mapping 713 of bits to states, and a block diagram of a data storage device configured to scramble shaped data prior to storing the shaped data to an MLC partition according to a third embodiment of the present disclosure.

When an SLC partition is programmed with data that is shaped such that the probability of an information bit to be '1' is higher than the probability of the information bit to be '0', upon copying the shaped data to an MLC flash memory, the distribution of the states of the MLC flash memory becomes non-uniform, illustrated in FIG. 7 as the non-uniform distribution of states 712 and the corresponding mapping 713 of bits to states. The mapping 713 indicates, for each state, a bit value for each of three logical pages: an upper page, a middle page, and a lower page.

The Erase state, which corresponds to three 1-s (i.e., "1 1 1") is the state with the highest probability. States A, E, and G each correspond to two 1-s and appear with a higher probability than states B, D, and F (corresponding to a single 1). State C, with all 0-s, has the lowest probability of the states. The lower page has '0' to '1' transitions between states Er and A and between states D and E. Because the states Er, A, and E are among the most popular states due to data shaping, the BER on the lower page (where a bit error occurs when a cell transitions between states Er-A and between states D-E) becomes higher than the BER of the middle page or of the lower page. A larger BER of the lower page at a decoder input causes the correction capability of the lower page to be degraded (as compared to the correction capability of the lower page storing data having a more uniform probability of '1' and '0'). One option for balancing the BER of the different pages is to adapt the verify levels (e.g., voltage levels that define transitions between states) according to the shaping.

For example, after applying a programming pulse (or a series of programming pulses), a series of reading with different reading voltages may be applied. Each state is assigned a verify level, and when a cell is determined to have reached its verify level (a function of the desired state of the cell) the cell is disabled from being further programmed. Adjusting the verify levels may help in balancing the BERs of the different pages. For example, assigning verify levels for more highly populated states to be farther apart than for less populated states assists in balancing BERs of the different pages.

Another option to help balance the BERs of different pages is to apply different programming step resolution as a function of the states, such that more highly populated states will correspond to narrower distribution lobes (e.g., be more tightly clustered at the center of the state's voltage range) than distribution lobes of less populated states. For example, smaller step sizes may be used for more highly populated states than for less populated states, increasing an accuracy of programming to the more highly populated states and resulting in a lower probability of error for each cell in the more highly populated states.

A third option to balance BER for different pages is illustrated in FIG. 7 and includes scrambling the shaped data prior to storage to the MLC to generate a substantially uniform distribution of states. The data storage device illustrated in FIG. 7 is configured to scramble shaped data prior to storing the shaped data to an MLC partition according to the third embodiment. The data storage device includes the controller 602 and the memory 604 of FIG. 6. The controller 602 includes the shaping unit 610, the ECC encoder 612, the decoder 308, and the de-shaping unit 630 of FIG. 6. The controller 602 may include a flash management module configured to determine destinations of data or other functions (such as wear-leveling) in the non-volatile memory 604 based on an amount of shaping of the data, such as described in further detail with respect to FIG. 8. The memory 604 includes the SLC partition 620 and the MLC partition 622 of FIG. 6 and also includes a scrambler 702 and a de-scrambler 706. The de-scrambler 706 can optionally be in the controller 602 instead of in the non-volatile memory 604.

According to the third embodiment, the data 609 (e.g., an input bit stream) received by the controller 602 of the data storage device from the external host 606 is processed by the shaping unit 610 to generate the shaped data 611 (e.g., an output bit stream). The input data 609 has size k' bits, and the shaped data 611 output by the shaping unit 610 has size k bits. In some implementations k'=k, i.e., the output of the shaping unit 610 is an output bit stream of the same size as the input bit stream. However, any method of shaping the input data 309 to create a non-uniform distribution may be applied including a case where the shaping increases the size of the bit stream representing the information (i.e., k>k'), such that the shaped data 611 is larger than the input data 609.

Although the shaping unit 610 is described as generating a proportion of 1-s in the output of the shaping unit 610 that is larger than the proportion of 1-s in the input bit stream, in other implementations the shaping unit 610 may instead generate a proportion of 0-s in the output of the shaping unit 610 that is larger than the proportion of 0-s in the input bit stream.

The shaped data 611 is encoded with the error correcting code (ECC) encoder 612 into an E-Block (i.e., an ECC codeword) to generate encoded data 613. The code rate of the encoded data 613 may be expressed as k I (k+m), meaning that m parity bits are added to each block of k information bits. The encoding performed by the ECC encoder 612 may be systematic (i.e., the information section of the codeword is left unchanged and parity bits are added during the encoding process) to maintain the shaping of the information section of the codeword.

The encoded data 613 is transferred from the controller 602 to the volatile memory 604 of the data storage device, such as a NAND flash memory die. The encoded data 613 may be provided to the scrambler 602, illustrated as a dashed line bypassing the SLC partition 620. Alternatively, the encoded data 613 may be first programmed into the SLC partition 620. Since the encoded data 613 is shaped to have more 1-s than 0-s (at least in the information section of codewords), wear of the cells in the SLC partition 620 is reduced as compared to storing unshaped data. During an on-chip copy of the encoded data from the SLC partition 620 to the MLC partition 622, the encoded data is processed by the scrambler 702, generating scrambled encoded data 703 that exhibits characteristics similar to random independent and identically distributed (i.i.d.) data. The scrambled encoded data 703 is programmed to the MLC partition 622. The scrambled encoded data 703 may be interleaved when stored to the MLC partition 622 (i.e., each codeword is programmed in multiple logical pages of the participating MLC cells) or non-interleaved (i.e., each codeword is programmed to a different logical page).

The SLC partition 620 benefits from decreased wear due to storing shaped data, while the MLC partition 622 is programmed with data that appears to be random data. Therefore, the logical pages of the programmed MLC partition 622 are more balanced in terms of the number of 1-s and 0-s that are stored as compared to the shaped data. As a result, the logical pages of the MLC may also be more balanced (as compared to storing shaped data) in terms of the BER observed on each of the logical pages upon sensing the MLC partition 622.

When reading and decoding data, the MLC partition 622 is sensed to generate a representation 705 of the scrambled encoded data 703. The representation 705 includes the scrambled encoded data 703 that may be altered by one or more bit errors. Since the MLC partition 622 is programmed with data that appears to be independent and identically distributed (i.i.d.), the representation 705 of the scrambled encoded data 703 is more balanced than the (shaped) encoded data 613 in terms of 1-s and 0-s appearing in the representation 705 of the scrambled encoded data 703 and in terms of the number of errors experienced by each of the logical pages of the MLC partition 622 storing the scrambled encoded data 703.

After sensing of the MLC partition 622, the representation 705 of the scrambled encoded data 703 is processed by the de-scrambler 706 to generate a representation 707 of the encoded data 613. As a result, the BER at the input to the decoder 308 may be the same as the BER of an i.i.d. source of data and is substantially equal for all logical pages storing the scrambled encoded data 703 (or, if the MLC partition 622 does not interleave stored data across all logical pages, the BER for each logical page may be as balanced as possible according to the applied mapping of bits to states, such as the mapping 713).

Scrambling the encoded data in accordance with the third embodiment helps balance BER because the MLC partition 622 is sensed while the MLC partition 622 contains (random) scrambled data, and errors in the cells of the MLC partition 622 originate from overlapping regions between states of a uniform distribution of cells within the MLC states that are manifested in the sensing operation. Decoding of the representation 707 of the codewords continues in a manner without modification due to the shaped nature of the representation 707.

According to a fourth embodiment, continuing with reference FIG. 7, the controller 602 further includes the decoder tuner 306. The decoder tuner 306 may count the number of 0-s (or 1-s) in a representation of a codeword (e.g., in the representation 707). The counted number of 0-s (or 1-s) is used to generate a correction to a-priori reliability values associated with the bits in the representation of the codeword. When the de-scrambled data (i.e., the representation 707) includes shaped data (i.e., shaped by operation of the shaping unit 610) such that the distribution of 1-s is different than the distribution of 0-s, a correction capability of the decoder 308 can be improved by taking this side information (i.e., an estimate of the shaping distribution) into account, such as described with respect to operation of the decoder tuner 306 of FIGS. 3-6.

An estimation of the amount of shaping may be global (i.e., based on all received data) or within a window, such as an overlapping sliding window or a series of non-overlapping windows. The decoder tuner 306 may be configured to update statistics corresponding to the proportion of 1-s to 0-s for each window. Estimates that are generated by the decoder tuner 306 of the number of 1-s (or 0-s) may be used to generate updated reliability measures that are more accurate than a-priori reliability values. Although the decoder tuner 306 is depicted at the input of the decoder 308, in other embodiments the decoder tuner 306 may be located elsewhere. The scrambler 702 may be in a die that includes the flash memory (as illustrated in FIG. 7) or may be in the controller 602 and external to a die that includes the flash memory.

In a fifth embodiment, a shaping degree (e.g., the proportion of '1's) is estimated prior to storage of the encoded data 613 in the non-volatile memory 604. For example, a mechanism similar to the decoder tuner 106 may be implemented at the output of the shaping unit 610 or at the output of the ECC encoding unit 612. If the data (e.g., the shaped data 611 or the encoded data 613) is determined to have a high degree of shaping, such as a shaping degree larger than a threshold, then the ECC encoder 612 may determine not to perform scrambling on the data. An additional bit (e.g., in a metadata portion or header portion within the memory 604) can be set to a first value (e.g., '0') to indicate that scrambling is not applied prior to storage in the MLC partition or the additional bit can be set to a second value (e.g., '1') to indicate to perform scrambling of data prior to storage in the MLC. The ECC decoder 308 may be configured to at least partially compensate for the lack of scrambling by adding the correction values (e.g., the correction factors 324 of FIG. 3 that may compensate for uneven BER due to shaping and that are computed by the decoder tuner unit 306) to the soft metrics (e.g., reliability values) corresponding to the received codeword.

Although the output of the shaping unit 610 is shaped, parity bits added by the ECC encoder 612 may not be shaped. In any or all of the disclosed embodiments, the decoder tuner 306 may be configured to generate and apply different correction values for the different windows of the representation of the codeword (i.e., one set of correction factors for the shaped information section and another set of correction factors for the parity bits).

The scrambling applied by the scrambling unit 702 in FIG. 7 may be implemented by generating a (pseudo) random scrambling word of 0-s and 1-s and applying a bit-wise exclusive-OR operation ("XOR-ing") of the scrambling word with the output of the sensed SLC page. For example, an independent scrambling word may be used for each logical page within a flash memory block. As another example, a same scrambling word may be used for all pages within a flash memory block. A correction capability of the upper, middle, and lower pages in an MLC partition may be approximately the same when an independent scrambling word is applied to each page, but the correction capability may differ when a common scrambling word is used for all pages or when no scrambling is applied.

Considering this difference in correction capability, different variants of implementing the second, third, fourth, and fifth embodiments of the present disclosure may be designed. According to one variant, scrambling is applied independently for each logical page (e.g., each logical page of the MLC partition is associated with a distinct scrambling word) in order to achieve balancing in correction capability of the decoder.

According to another variant, joint scrambling is applied to all pages, but different encoding schemes are used for improving the correction capability of each logical page. For example, a code rate may differ for each logical page, either by encoding data for different pages with different codes or by performing different amounts of puncturing on the same codes for each page.

Other variants include a scrambling transformation that is applied to the SLC sensing output in order to improve the overall performance of the system. Such a variant may include scrambling only some of the pages, while the other pages are left unscrambled.

FIG. 8 illustrates an embodiment of a data storage device where the non-volatile memory 604 is a flash memory and where the controller 602 performs one or more flash management functions at least partially based on an amount of shaping that is applied to data (e.g., data 609) during generation of shaped data 611. The shaping unit 610 provides feedback regarding the shaping level to a flash management module 802. The flash management module 802 may include a block selector 804 that is configured to use the shaping level information in order to decide in which block to store the data according to its shaping level. For example, the flash management module 802 may maintain two types of blocks: blocks that store data with a shaping level above a threshold ("shaped blocks") and blocks that store data with shaping level below a threshold ("non-shaped blocks"), illustrated as a first group of blocks 820 and a second group of blocks 822, respectively, in the flash memory 604. The shaped blocks in the first group 820 may be programmed using a faster flash trim (i.e., programming parameters corresponding to a higher programming throughput), while the non-shaped blocks in the second group 822 may be programmed using a conventional flash trim (i.e., programming parameters corresponding to a nominal programming throughput). As a result, the average programming throughput of the memory system may be higher than the nominal programming throughput of a conventional system with a single flash trim. More than two types of blocks may be maintained corresponding to a finer granularity of shaping levels.

The shaping level feedback may be used by a wear leveler 806 the flash management module 802 to increase endurance rather than programming throughput. This may be done by performing more W/E cycles on shaped blocks for which higher correction capability is available (e.g., blocks in the first group 820) and hence higher error rates can be tolerated, as compared to less W/E cycles on non-shaped blocks (e.g., blocks in the second group 822) for which nominal correction capability is available and hence lower error rates may be tolerated. A wear leveling algorithm employed by the flash management module 802 may perform wear leveling on each group of blocks 820, 822 separately, while determining an expected number of W/E cycles directed to each group according to the expected shaping level of the blocks in the respective group. (In contrast to conventional wear leveling algorithms, which may try to maintain a constant wear leveling (i.e., number of W/E cycles) on all the blocks of a memory). As a result of wear leveling by the wear leveler 806 as a function of shaping level, an overall endurance (i.e., number of W/E cycles) of the memory may increase.

Although the term "shaped blocks" is used to describe blocks that store data for which the shaping unit generates a "high" level of shaping (e.g., an amount of shaping that meets or exceeds a threshold amount), the actual data stored into the "shaped blocks" may or may not be scrambled after the shaping and prior to programming it into the block. In case the data is scrambled prior to programming the data into the block (as shown in FIG. 7, as an example) then the block may still be considered a shaped block, even though the actual data stored in it is scrambled and hence not shaped. This is because the data prior to scrambling is shaped and hence during read, after the descrambling, the read data will be again shaped and as a result increased error correction capability may be provided by the ECC decoder.

Figure 9:
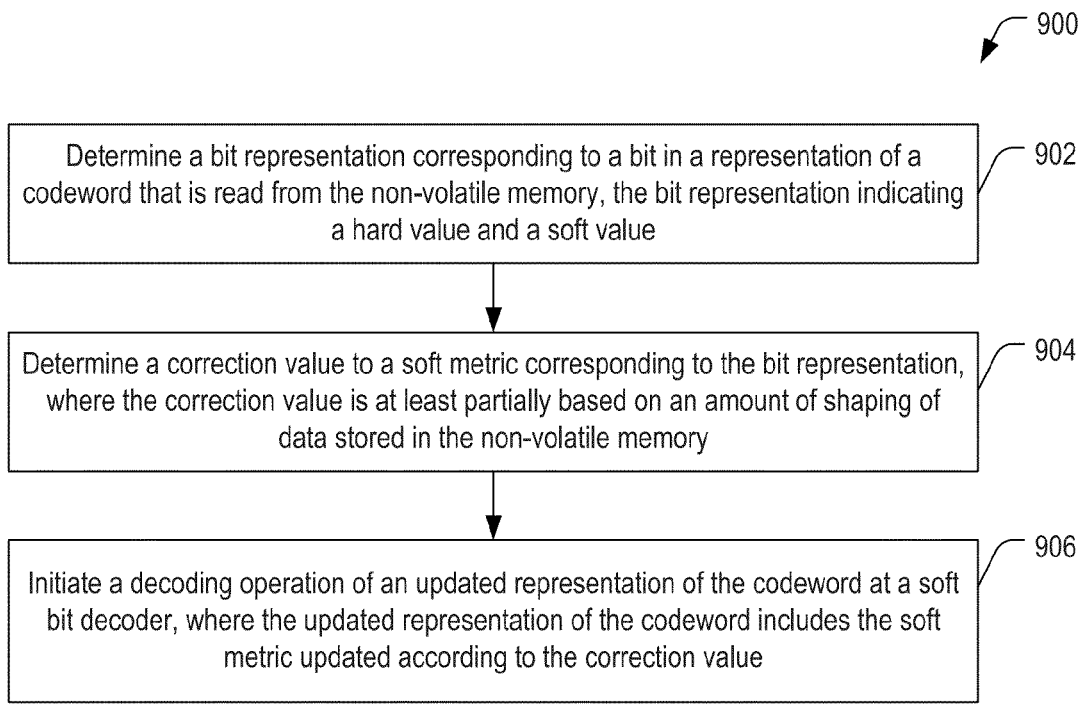
FIG. 9 is a flow chart illustrating a particular embodiment of a method of decoding shaped data.

FIG. 9 illustrates an embodiment of a method 900 of decoding shaped data. The method 900 may be performed in a data storage device that includes a non-volatile memory, such as the data storage device of FIG. 6.

A bit representation corresponding to a bit in a representation of a codeword that is read from the non-volatile memory is determined, at 902. The bit representation indicates a hard value and a soft value. For example, the bit representation may be the representation of the codeword 122 of FIG. 1.

A correction value to a soft metric corresponding to the bit representation is determined, at 904. The correction value is at least partially based on an amount of shaping of data stored at the non-volatile memory. For example, the correction value may be one of the correction values 324 generated by the decoder tuner 306 of FIG. 3-4 or FIG. 6. The correction value may be determined according to an LLR correction term based on the amount of shaping. For example, the amount of shaping of the data stored in the non-volatile memory may correspond to an entropy of the data. As another example, the amount of data may correspond to a distribution of hard values in the data. To illustrate, the distribution may be determined by the decoder tuner 306 of FIG. 3 counting occurrences of 1-s in the bit representation, occurrences of 0-s in the bit representation, or any combination thereof. The correction value may be computed further based on received bit reliability information. The correction value may be determined based on side information, such as the decoder tuner 306 receiving an indication of the amount of shaping (e.g., computed by the shaping unit 610 of FIG. 6).

A decoding operation of an updated representation of the codeword is initiated at a soft bit decoder, at 906. The updated representation of the codeword includes the soft metric updated according to the correction value. For example, the soft decoder 308 may receive the soft metric generated by the metric generator 312 and the correction values 324, as illustrated in FIG. 3, or the updated representation of the soft metric provided by the adder of FIG. 4. For example, the soft metric may include an LLR value. As another example, the soft metric may include a hard value and at least one of a reliability value, a likelihood value, or a probability value.

An error correction capability of decoding the representation of the codeword may be estimated based on the amount of shaping. In response to the estimated error correction capability being below a threshold, the non-volatile memory may be sensed to determine additional soft bits. For example, the decoder tuner 306 of FIG. 3 may send the request 326 to read additional soft bits.

The amount of shaping of data stored in the non-volatile memory may correspond to a distribution of hard values in the data. The distribution may be a global distribution. Alternatively, the distribution may be a local distribution. For example, the local distribution may be determined according to a sliding window of a data stream or according to a series of non-overlapping windows. To illustrate, one window may correspond to an information portion of a representation of a codeword and another window may correspond to a parity portion of a representation of the codeword.

The method 900 may be implemented in a data storage device that includes a non-volatile memory and a controller, such as the data storage device of FIG. 6. For example, the controller 602 of FIG. 6 may be configured to determine a bit representation corresponding to a bit in a representation of a codeword that is read from the non-volatile memory 604. The bit representation may indicate a hard value and a soft value. The controller 602 may also be configured to determine a correction value to a soft metric corresponding to the bit representation. The correction value may be at least partially based on an amount of shaping of data stored in the non-volatile memory. For example, the amount of shaping may correspond to a distribution of hard values in the representation of the codeword. The controller 602 may further be configured to initiate a decoding operation of an updated representation of the codeword at the soft bit decoder 108, where the updated representation of the codeword includes the soft metric updated according to the correction value.

The controller 602 may be further configured to estimate an error correction capability of decoding the representation of the codeword based on the amount of shaping. The controller 602 may also be configured to initiate sensing of the non-volatile memory 604 to determine additional soft bits in response to the estimated error correction capability being below a threshold.

Figure 10:
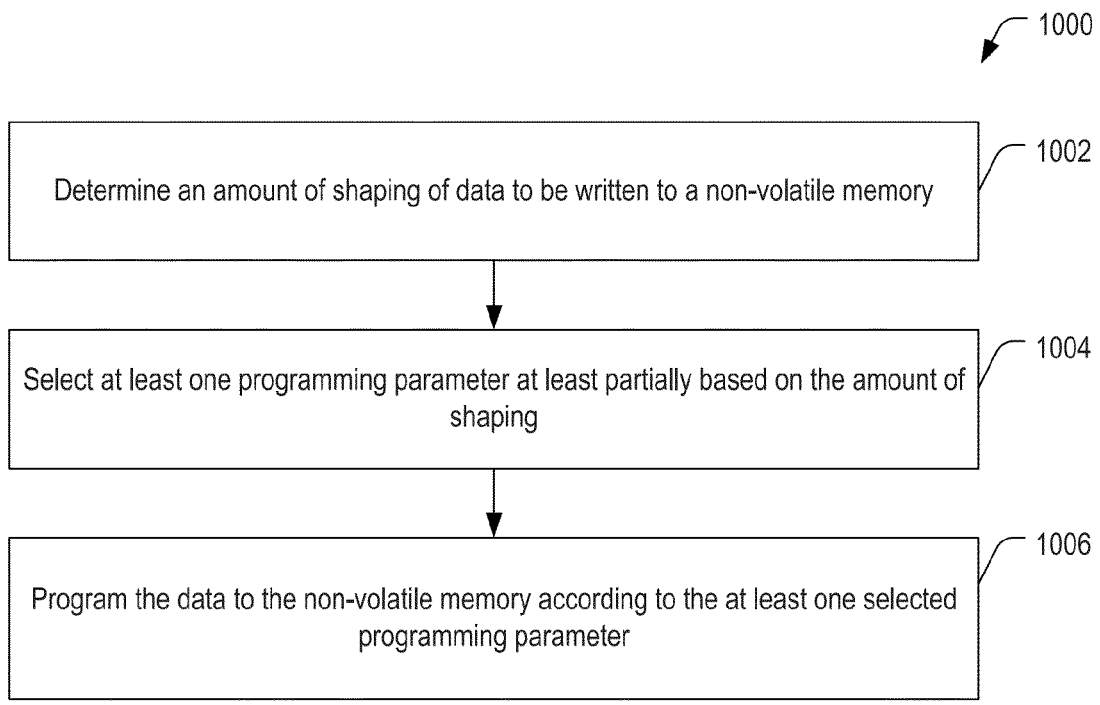
FIG. 10 is a flow chart illustrating a particular embodiment of a method of storing shaped data.

FIG. 10 illustrates an embodiment of a method 1000 of storing shaped data. The method 1000 may be performed in a data storage device that includes a non-volatile memory, such as the data storage device of FIG. 6.

An amount of shaping of data to be written to the non-volatile memory is determined, at 1002. At least one programming parameter is selected at least partially based on the amount of shaping, at 1004. For example, the data may include a codeword and the amount of shaping may be determined based on a distribution of bit values in the codeword. Selecting the at least one programming parameter may include estimating a correction capability of the codeword at least partially based on a code rate of the codeword and the distribution of the bit values in the codeword and determining the at least one programming parameter (e.g., a series of programming pulses or a plurality of verify levels) based on the estimated correction capability. The data is programmed to the non-volatile memory according to the at least one selected programming parameter, at 1006.

For example, the method 1000 may be performed in the data storage device of FIG. 6. The controller 602 may be configured to determine an amount of shaping of data (e.g., a distribution of hard values in the encoded shaped data 613) to be written to the non-volatile memory 604. The controller 602 may also be configured to select a programming parameter, such as a programming step size, at least partially based on the amount of shaping. The controller 602 may further be configured to program the data to the non-volatile memory 604 (e.g., in the MLC partition 622) according to the selected programming parameter.

To illustrate, the controller 602 may be configured to estimate a correction capability of a codeword in the encoded shaped data 613 at least partially based on a code rate of the codeword and the amount of shaping of the codeword. The controller 602 may be configured to determine a series of programming pulses based on the estimated correction capability.

In some implementations, the method 1000 may be performed to reduce a write latency associated with writing the data to the non-volatile memory. For example, the at least one programming parameter can include a programming step size that is selected based on an amount of shaping of the data. The selected programming step size may be larger than a programming step size corresponding to unshaped data. Using the selected programming step size can enable faster programming of the data to the non-volatile memory as compared to using the programming step size corresponding to unshaped data.

In some implementations, the method 1000 may be performed to at least partially offset an unbalanced BER among multiple logical pages of a MLC memory that arises when shaped data is stored to a MLC partition, such as described with respect to FIG. 7. A shaping of the data indicated by the distribution of bit values may cause a state of the MLC partition to be more highly populated than a less-populated state of the MLC partition when the data is programmed to the MLC partition. The at least one programming parameter may be selected to reduce an error rate associated with the more highly populated state. For example, the at least one programming parameter may include a programming step size. The programming step size may be selected to be smaller for a more highly-populated state than for a less-populated state. As another example, the at least one programming parameter may include a verify level. To illustrate, the controller 602 may determine a plurality of verify levels based on the estimated correction capability and the estimated error rate. The verify levels of the plurality of verify levels corresponding to a more highly populated state of storage elements in the non-volatile memory may be spaced farther apart than verify levels corresponding to a less-populated state of the storage elements. Other methods to at least partially offset an unbalanced BER among multiple logical pages of a MLC memory may include data scrambling, such as described with respect to FIGS. 13-14.

Figure 11:
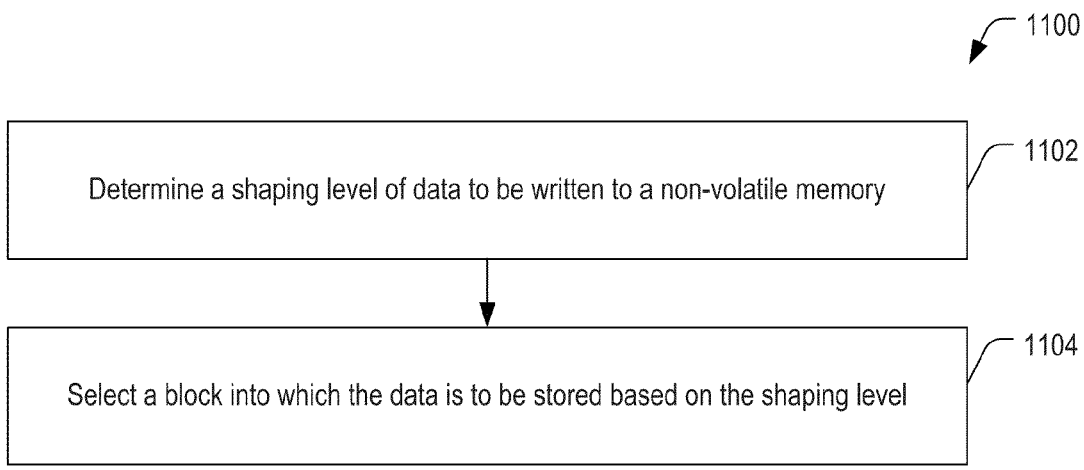
FIG. 11 is a flow chart illustrating another embodiment of a method of storing shaped data.

FIG. 11 illustrates an embodiment of a method 1100 of storing shaped data. The method 1100 includes determining a shaping level of data to be written to a non-volatile memory, at 1102. For example, the flash management module 802 of FIG. 8 may receive feedback from the shaping unit 610 indicating an amount or level of shaping. A block may be selected into which the data is to be stored based on the shaping level of the data, at 1104. For example, the block selector 804 of FIG. 8 may compare the shaping level to a threshold, and may select a block from the first group 820 in response to the shaping level being equal to or greater than the threshold or may select a block from the second group 822 in response to the shaping level being less than the threshold.

To illustrate, an amount of shaping of bit values in data to be written to the non-volatile memory may be determined, such as by the shaping unit 610 of FIG. 6 providing an indication of the amount of shaping to the flash management module 802 of FIG. 8. A storage location of the data within the non-volatile memory may be selected at least partially based on the amount of shaping, such as described with respect to the block selector 804 of FIG. 8. The data may be programmed to the selected storage location within the non-volatile memory. Although described as a selection of one or more blocks, the selected storage location may alternatively (or in addition) include a selection of a die, plane, array, block, word line, word line portion, or any other location within the non-volatile memory.

The controller (e.g., the flash management module 802 of FIG. 8) may be configured to determine programming parameters used for programming the data into the storage location within the non-volatile memory at least partially based on the amount of shaping of the data. For example, separate block groups or "pools" may be used for shaped data and for non-shaped data (i.e., data with an amount of shaping less than a threshold) and different programming trims may be used for the shaped and non-shaped block pools. To illustrate, faster trim may be used for the blocks designated for storing shaped data and that may therefore be able to tolerate higher bit error rates.

The controller (e.g., the wear leveler 806 of FIG. 8) may be configured to determine a ratio of write/erase cycles directed into the storage location within the non-volatile memory at least partially based on the amount of shaping of the data stored. For example, the controller may provide extended endurance by adjusting wear leveling of each block pool according to a shaping level of data for each block pool, such that more write/erase cycles are directed into blocks storing shaped data (and that may therefore be more tolerant to higher bit error rates) as opposed to blocks storing unshaped data.

Figure 12:
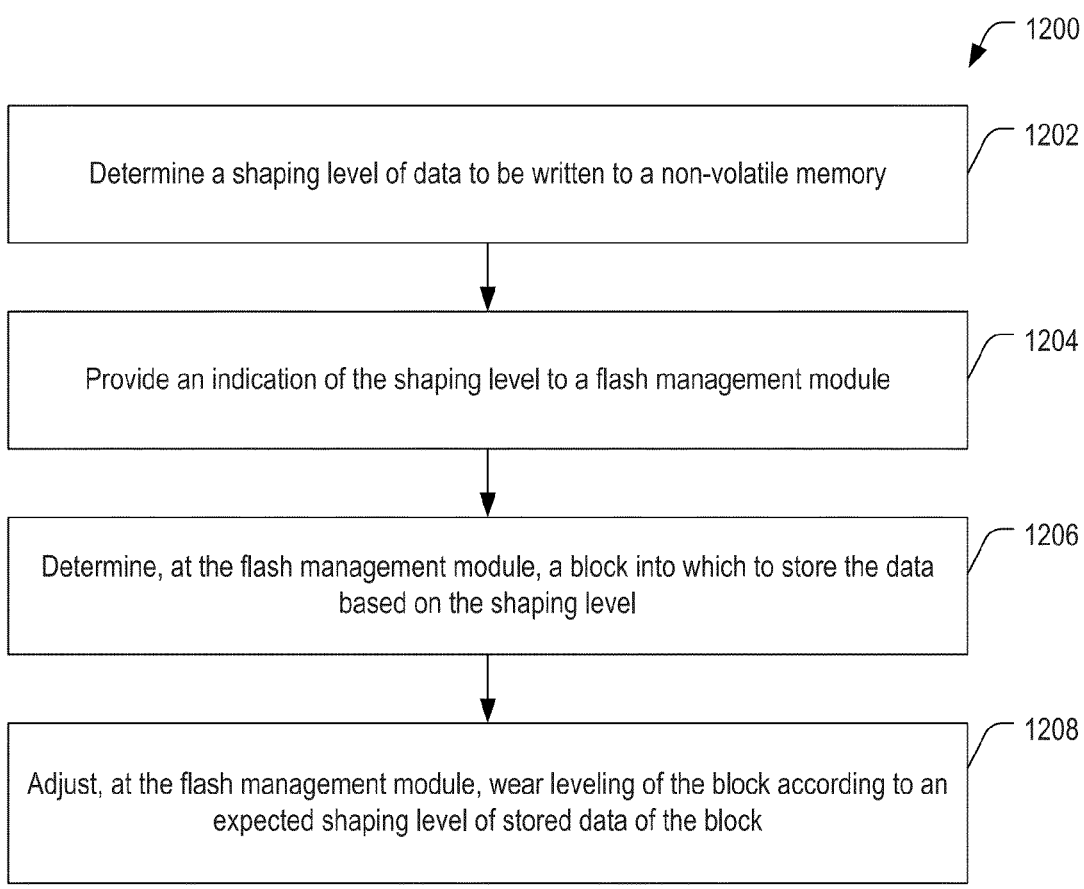
FIG. 12 is a flow chart illustrating another embodiment of a method of storing shaped data.

FIG. 12 illustrates an embodiment of a method 1200 of storing shaped data. The method 1200 includes determining a shaping level of data to be written to a non-volatile memory, at 1202. For example, the shaping unit 610 of FIG. 8 may determine a shaping level of shaped data. The shaping level may be provided to a flash management module, at 1204, such as the flash memory module 802 of FIG. 8. A determination may be made, at the flash management module, of a block into which the data is to be stored based on the shaping level of the data, at 1206. For example, the block selector 804 of FIG. 8 may compare the shaping level to a threshold, and may select a block from the first group 820 in response to the shaping level being equal to or greater than the threshold or may select a block from the second group 822 in response to the shaping level being less than the threshold.

The flash management module may adjust the wear leveling of the block into which the data is stored according to the expected shaping level of the data stored in the block, at 1208. For example, a block storing highly shaped data may tolerate higher wearing (i.e., a higher number of W/E cycles) as higher error correction capability is achievable for the data stored in the block and hence higher error rates may be tolerated. To illustrate, the wear leveler 806 of FIG. 8 may control wear leveling so that a higher number of W/E cycles are applied to blocks of the first group 820 (e.g., corresponding to higher shaping levels) than to blocks of the second group 822 (e.g., corresponding to lower shaping levels).

Figure 13:
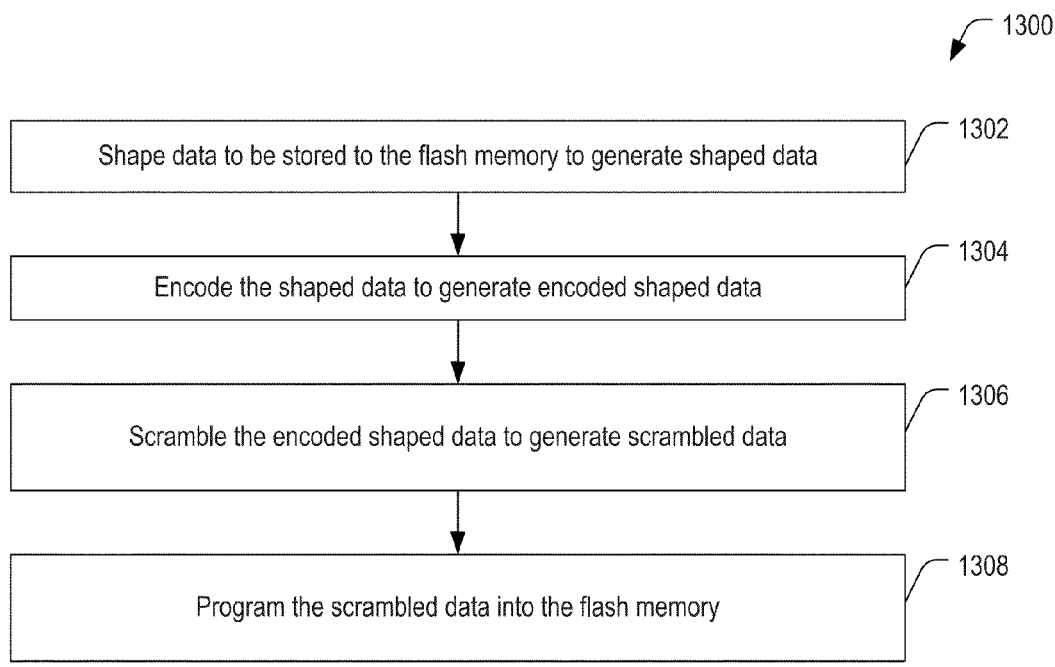
FIG. 13 is a flow chart illustrating another embodiment of a method of storing shaped data.

FIG. 13 illustrates an embodiment of a method 1300 of storing shaped data. The method 1300 may be performed in a data storage device that includes a flash memory, such as the data storage device of FIG. 7.

The method 1300 includes shaping data to be stored to the flash memory to generate shaped data, at 1302. For example, the controller 602 of FIG. 7 is configured to shape the data 609 at the shaping unit 610 to generate the shaped data 611. The shaped data may have a same number of bits as the data (e.g., k=k' in FIG. 7). For example, shaping the data may be performed via a block transformation.

The shaped data is encoded to generate encoded shaped data, at 1304. For example, the controller 602 of FIG. 7 is configured to encode the shaped data 611 at the ECC encoder 612 to generate the encoded shaped data 613. The encoded shaped data is scrambled to generate scrambled data, at 1306. The scrambled data is programmed into a flash memory, at 1308.

Scrambling the programmed shaped data may include providing the encoded shaped data to an input of a scrambler, such as the scrambler 702 of FIG. 7. The scrambled data may be provided at an output of the scrambler, such as the scrambled data 703. The scrambler may be in a controller external to a die that includes the flash memory, such as in the controller 602 of FIG. 7 that is external to a die that includes the non-volatile memory 604. Alternatively, the scrambler may be in a die that includes the flash memory, such as the scrambler 702 of FIG. 7.

The encoded shaped data may be programmed into a single level cell (SLC) partition of the flash memory, such as the SLC partition 620 of FIG. 7. For example, the controller 602 of FIG. 7 may be configured to program the encoded shaped data 613 to the SLC partition 620. The encoded shaped data may be read from the SLC partition and provided to a scrambler to generate the scrambled data, and the scrambled data may be programmed to a multi-level cell (MLC) partition of the flash memory. In another implementation, the scrambled data may be programmed into the flash memory without first storing the encoded shaped data to a SLC partition.

Each logical page of the MLC partition may be associated with a distinct scrambling word. Alternatively, multiple logical pages within a same word line of the MLC partition may be associated with a common scrambling word.

Figure 14:
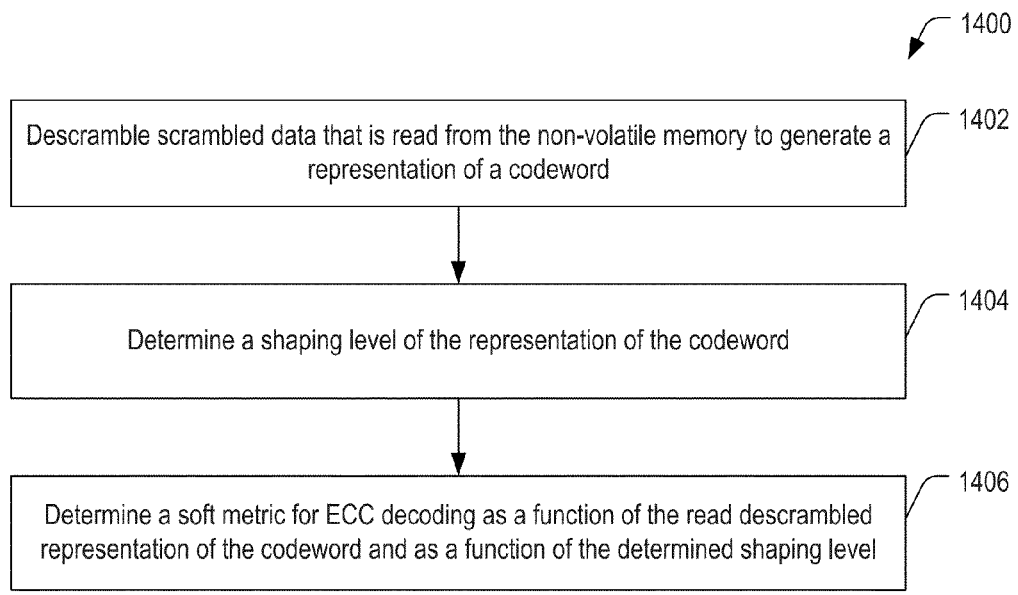
FIG. 14 is a flow chart illustrating another embodiment of a method of decoding shaped data.

FIG. 14 illustrates an embodiment of a method 1400 of decoding shaped data. The method 1400 may be performed in a data storage device that includes a non-volatile memory, such as the data storage device of FIG. 7.

The method 1400 includes descrambling scrambled data that is read from the non-volatile memory to generate a representation of a codeword, at 1402. For example, the controller 602 of FIG. 7 may be configured to descramble the representation 705 of the scrambled encoded data 703, such as in an embodiment where the descrambler 706 is within the controller 602.

A shaping level of the shaped data is determined, at 1404. The amount of shaping may correspond to a global distribution of hard values. Alternatively, the amount of shaping may correspond to a local distribution of hard values. For example, the local distribution may be determined according to a sliding window of a data stream or as a series of non-overlapping windows.

A soft metric is determined for ECC decoding based on the read descrambled representation of the codeword and the determined shaping level, at 1406. As an example, an initial soft metric may be assigned to each bit in the representation of the codeword by the controller 602 of FIG. 7, such as by determining hard values based on sensed data from the non-volatile memory 604 and retrieving a-priori LLR values from a table of LLR values. Correction values may be determined for the soft metrics based on an amount of shaping by the controller 602 via the decoder tuner 306 of FIG. 7. An another example, the soft metric may be determined as a function of the read descrambled representation of the codeword and as a function of the determined shaping level according to a single computational step.

An error correction capability of decoding the representation of the codeword may be estimated based on the amount of shaping. The non-volatile memory may be sensed to determine additional soft bits in response to the estimated error correction capability being below a threshold. For example, in response to the decoder tuner 306 of FIG. 7 determining that an estimated error correction capability is below a threshold, the controller 602 may be configured to instruct reading of additional soft bits from the MLC partition 622.

Figure 15:
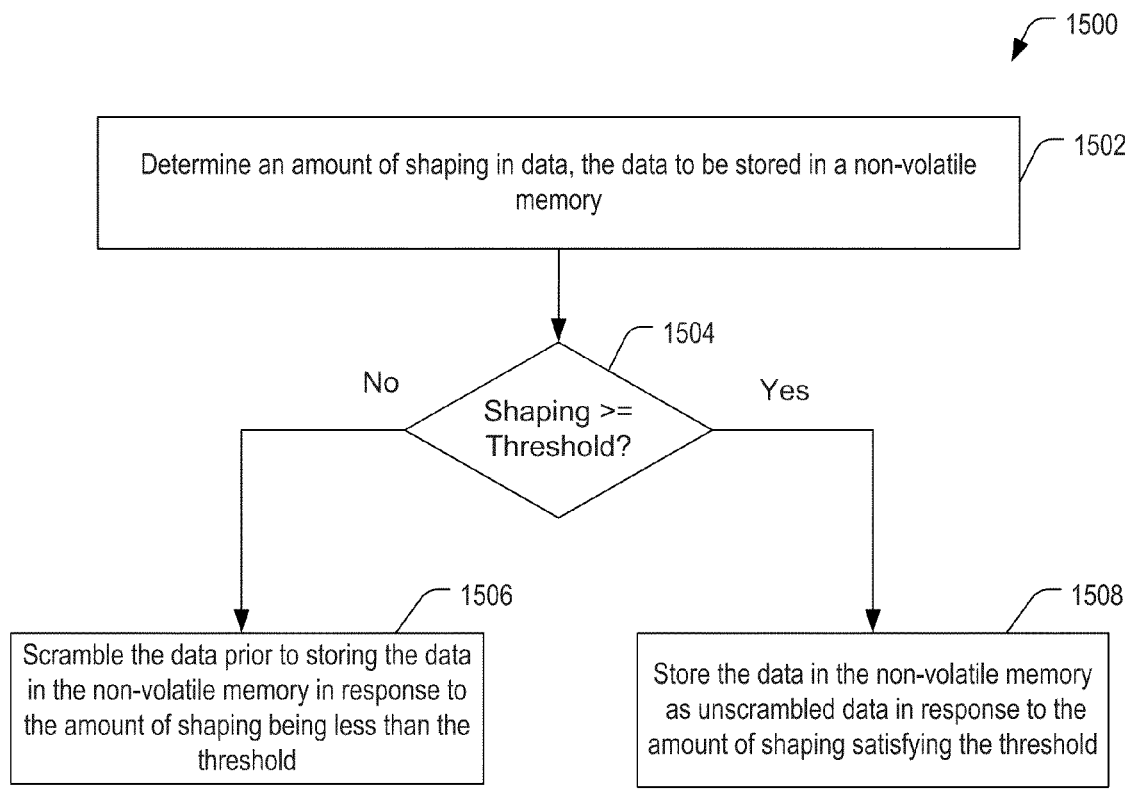
FIG. 15 is a flow diagram illustrating another embodiment of a method of storing shaped data.

FIG. 15 illustrates an embodiment of a method 1500 of storing shaped data. The method 1500 may be performed in a data storage device that includes a non-volatile memory, such as the data storage device of FIG. 7.

An amount of shaping in data (e.g., a ratio of 1-s to 0-s in the data) is determined, at 1502. The data is to be stored in the non-volatile memory, such as in a multi-level cell (MLC) partition of the non-volatile memory. The proportion of first bit values to second bit values may be compared to a threshold, at 1504. The threshold may correspond to an amount of shaping where additional errors due to un-balanced BER are offset by the correction values 324 generated by the decoder tuner 306 of FIG. 3.

The data is scrambled prior to storing the data in the non-volatile memory in response to the amount of shaping being less than a threshold, at 1506. Otherwise, the data is stored in the non-volatile memory as unscrambled data in response to the amount of shaping satisfying the threshold, at 1508. For example, the controller 602 of FIG. 7 may determine an amount of shaping applied by the shaping unit 610 and may set an indicator (e.g., an additional bit) to have a first value indicating that the data is to be scrambled when copied to the MLC partition 622 or to have a second value indicating that the data is to remain unscrambled when copied to the MLC partition 622. The descrambler 706 may be configured to selectively descramble data read from the MLC flash based on the indicator.

Although various components depicted herein are illustrated as block components and described in general terms, such components may include one or more microprocessors, state machines, or other circuits configured to enable the disclosed components to perform the particular functions attributed to such components. For example, the decoder tuner 306 of FIG. 3 may represent physical components, such as hardware controllers, state machines, logic circuits, or other structures, to enable the decoder tuner 306 to generate the correction values 324 based on the extent of data shaping.

Alternatively, one of more aspects of the functionality of the decoder tuner 106 may be implemented using a microprocessor or microcontroller programmed to perform the respective functionality. In a particular embodiment, the memory 604 includes executable instructions that are executed by a processor in the controller 602. Alternatively, or in addition, executable instructions that are executed by a processor in the controller 602 may be stored at a separate memory location that is not part of the memory 604, such as at a RAM or at a read-only memory (ROM).

In a particular embodiment, the data storage device illustrated in FIG. 6, FIG. 7, and/or FIG. 8 may be a portable device configured to be selectively coupled to one or more external devices. However, in other embodiments, the data storage device may be attached or embedded within one or more host devices, such as within a housing of a portable communication device. For example, the data storage device may be within a packaged apparatus such as a wireless telephone, a personal digital assistant (PDA), a gaming device or console, a portable navigation device, a computer device, or other device that uses internal non-volatile memory. In a particular embodiment, the data storage device 602 includes a non-volatile memory, such as a flash memory (e.g., NAND, NOR, Multi-Level Cell (MLC), Divided bit-line NOR (DI-NOR), AND, high capacitive coupling ratio (HiCR), asymmetrical contactless transistor (ACT), or other flash memories), an erasable programmable read-only memory (EPROM), an electrically-erasable programmable read-only memory (EEPROM), a read-only memory (ROM), a one-time programmable memory (OTP), or any other type of memory.

The illustrations of the embodiments described herein are intended to provide a general understanding of the various embodiments. Other embodiments may be utilized and derived from the disclosure, such that structural and logical substitutions and changes may be made without departing from the scope of the disclosure. This disclosure is intended to cover any and all subsequent adaptations or variations of various embodiments. Accordingly, the disclosure and the figures are to be regarded as illustrative rather than restrictive.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   in a data storage device including a non-volatile memory, performing:
      receiving a representation of a codeword that is read from the non-volatile memory;
      determining a shaping level of a set of one or more bits of the representation of the codeword;
      determining a soft metric of each bit of the one or more bits of the representation of the codeword based on a value of the bit in the received representation and based on the shaping level; and
      initiating a decoding operation of the codeword based on the soft metrics.

2. The method of claim 1, wherein the shaping level is determined based on stored side information.

3. The method of claim 1, wherein the shaping level is determined as a function of read values of the representation of the codeword read from the non-volatile memory.

4. The method of claim 3, wherein the shaping level is determined as a function of a number of occurrences of each of the read values within the set of one or more bits.

5. The method of claim 1, wherein determining the soft metric of each bit comprises:
   determining an initial soft metric of each bit based on a read value of the bit;
   determining a correction value to the initial soft metric of each bit, wherein the correction value is at least partially based on the shaping level; and
   generating the soft metric of each bit by applying the correction value to the initial soft metric.

6. The method of claim 5, wherein the correction value is computed further based on received bit reliability information.

7. The method of claim 1, further comprising estimating an error correction capability of decoding the representation of the codeword based on the shaping level.

8. The method of claim 7, further comprising sensing the non-volatile memory to determine additional soft bits in response to the estimated error correction capability being below a threshold.

9. The method of claim 7, further comprising determining the soft metric as a function of the estimated error correction capability.

10. The method of claim 1, wherein the set of one or more bits is determined according to a sliding window of a data stream.

11. The method of claim 1, wherein the soft metric includes a hard value and at least one of a reliability value, a likelihood value, or a probability value.

12. The method of claim 1, wherein the soft metric includes a log likelihood value.

13. A data storage device comprising:
    a non-volatile memory; and
    a controller configured to:
       read a representation of a codeword from the non-volatile memory;
       determine a shaping level of a set of one or more bits of the representation of the codeword;
       determine a soft metric of each bit of the one or more bits of the representation of the codeword based on a value of the bit in the representation of the codeword and based on the shaping level; and
       initiate a decoding operation of the codeword based on the soft metrics.

14. The data storage device of claim 13, wherein the controller is further configured to estimate an error correction capability of decoding the representation of the codeword based on the shaping level.

15. The data storage device of claim 14, wherein the controller is further configured to initiate sensing of the non-volatile memory to determine additional soft bits in response to the estimated error correction capability being below a threshold.

16. The data storage device of claim 14, wherein the controller is further configured to determine the soft metric as a function of the estimated error correction capability.

17. A method comprising:
    in a data storage device including a non-volatile memory, performing:
       determining a shaping level of data to be written to the non-volatile memory;
       selecting at least one programming parameter at least partially based on the shaping level; and
       programming the data to the non-volatile memory according to the at least one selected programming parameter.

18. The method of claim 17, wherein the data includes a codeword, wherein the shaping level is determined based on a distribution of bit values in the codeword, and wherein selecting the at least one programming parameter includes:
    estimating a correction capability at least partially based on a code rate of the codeword and the distribution of the bit values in the codeword; and
    determining the at least one programming parameter based on the estimated correction capability.

19. The method of claim 17, wherein the at least one programming parameter includes a programming step size that is selected based on the shaping level, wherein the selected programming step size is larger than a programming step size corresponding to unshaped data, and wherein using the selected programming step size enables faster programming of the data to the non-volatile memory as compared to using the programming step size corresponding to unshaped data.

20. The method of claim 17, wherein the non-volatile memory includes a multi-level cell (MLC) partition, wherein the shaping of the data causes a state of the MLC partition to be more highly populated than a less-populated state of the MLC partition when the data is programmed to the MLC partition, and wherein the at least one programming parameter is selected to reduce an error rate associated with the more highly populated state.

21. The method of claim 20, wherein the at least one programming parameter includes a programming step size and wherein a programming step size for the more highly populated state is smaller than a programming step size for the less-populated state.

22. The method of claim 20, wherein the at Least one programming parameter includes a verify level.

23. A data storage device comprising:
a non-volatile memory; and
a controller configured to:
determine a shaping level of bit values in data to be written to the non-volatile memory;
select at least one programming parameter at least partially based on the shaping level; and
program the data to the non-volatile memory according to the at least one selected programming parameter.

24. The data storage device of claim 23, wherein the data includes a codeword, wherein the shaping level is determined based on a distribution of bit values in the codeword, and wherein the controller is configured to:
estimate a correction capability at least partially based on a code rate of the codeword and the distribution of the bit values in the codeword; and
determine the at least one programming parameter based on the estimated correction capability.

25. The data storage device of claim 23, wherein the data includes a codeword, wherein the shaping level is determined based on a distribution of bit values in the codeword, and wherein the controller is configured to:
estimate a correction capability at least partially based on a code rate of the codeword and the distribution of the bit values in the codeword; and
determine a plurality of verify levels based on the estimated correction capability.

26. The data storage device of claim 25, wherein verify levels of the plurality of verify levels corresponding to a more highly populated state of storage elements in the non-volatile memory are spaced farther apart than verify levels corresponding to a less-populated state of the storage elements.

27. A method comprising:
in a data storage device including a controller and a non-volatile memory, performing:
descrambling scrambled data that is read from the non-volatile memory to generate a representation of a codeword;
determining a shaping level of the representation of the codeword; and
determining a soft metric for decoding based on the representation of the codeword and based on the shaping level.

28. The method of claim 27, further comprising estimating an error correction capability of decoding the representation of the codeword based on the shaping level.

29. The method of claim 28, further comprising sensing the non-volatile memory to determine additional soft bits in response to the estimated error correction capability being below a threshold.

30. The method of claim 27, wherein the shaping level corresponds to a global distribution of hard values.

31. The method of claim 27, wherein the shaping level corresponds to a local distribution of hard values.

32. The method of claim 31, wherein the local distribution is determined according to a sliding window of a data stream.

33. A data storage device comprising:
a non-volatile memory; and
a controller configured to:
descramble scrambled data that is read from the non-volatile memory to generate a representation of a codeword;
determine a shaping level of the representation of the codeword; and
determine a soft metric for decoding based on the representation of the codeword and based on the shaping level.

34. The data storage device of claim 33, wherein the controller is further configured to estimate an error correction capability of decoding the representation of the codeword based on the shaping level.

35. The data storage device of claim 34, wherein the non-volatile memory is sensed to determine additional soft bits in response to the estimated error correction capability being below a threshold.

36. A method comprising:
in a data storage device including a controller and a non-volatile memory, performing:
determining a shaping level of data to be stored in the non-volatile memory;
scrambling the data prior to storing the data in the non-volatile memory in response to the shaping level being less than a threshold; and
storing the data in the non-volatile memory as unscrambled data in response to the shaping level satisfying the threshold.

37. A data storage device comprising:
a non-volatile memory; and
a controller configured to:
determine a shaping level of data to be stored in the non-volatile memory;
set an indicator to have a first value to cause scrambling of the data prior to storing the data in the non-volatile memory in response to the shaping level being less than a threshold; and
set the indicator to have a second value to cause the data to be stored in the non-volatile memory as unscrambled data in response to the shaping level satisfying the threshold.

38. A method comprising:
in a data storage device including a non-volatile memory, performing:
determining a bit representation corresponding to a bit in a representation of a codeword that is read from the non-volatile memory;
determining a soft metric corresponding to the bit representation, wherein the soft metric is at least partially based on a shaping level of data stored in the non-volatile memory; and
initiating a decoding operation of the soft metric.

39. The method of claim 38, wherein, determining the soft metric includes:
determining an estimated amount of shaping of at least a portion of the representation of the codeword; and
sending an indication of the estimated amount of shaping to a soft decoder.

40. The method of claim 38, wherein determining the soft metric includes:
determining an initial soft metric corresponding to the bit representation at least partially based on a table lookup operation;
determining a soft metric correction value corresponding to the hit representation; and updating the initial soft metric according to the soft metric correction value.

41. A data storage device comprising:
a non-volatile memory; and
a controller configured to:
   determine a bit representation corresponding to a bit in a representation of a codeword that is read from the non-volatile memory;
   determine a soft metric corresponding to the bit representation, wherein the soft metric is at least partially based on a shaping level of data stored in the non-volatile memory; and
   initiate a decoding operation of the soft metric.

42. A data storage device comprising:
a non-volatile memory; and
a controller configured to:
   determine a shaping level of bit values in data to be written to the non-volatile memory;
   select a storage location of the data within the non-volatile memory at least partially based on the shaping level; and
   program the data to the selected storage location within the non-volatile memory.

43. The data storage device of claim 42, wherein the controller is further configured to determine programming parameters used for programming the data into the storage location within the non-volatile memory at least partially based on the shaping level.

44. The data storage device of claim 42, wherein the controller is further configured to determine a ratio of write/erase cycles directed into the storage location within the non-volatile memory at least partially based on the shaping level.

45. A method comprising:
in a data storage device including a non-volatile memory, performing:
   determining a shaping level of bit values in data to be written to the non-volatile memory;
   selecting a storage location of the data within the non-volatile memory at least partially based on the shaping level; and
   programming the data to the selected storage location within the non-volatile memory.

46. A method comprising:
in a data storage device including a controller and a flash memory, performing:
   shaping data to be stored to the flash memory to generate shaped data;
   encoding the shaped data to generate encoded shaped data;
   scrambling the encoded shaped data to generate scrambled data;
   programming the scrambled data into the flash memory;
   reading the scrambled data from the flash memory;
   descrambling the scrambled data that is read from the flash memory to generate a representation of a codeword;
   determining a shaping level of the representation of the codeword; and
   determining a soft metric for decoding based on the representation of the codeword and based on the shaping level.

47. The method of claim 46, further comprising, prior to scrambling the encoded shaped data:
   programming the encoded shaped data into a single level cell (SLC) portion of the flash memory; and
   reading the encoded shaped data from the SLC portion; and
   providing the encoded shaped data to a scrambler, wherein the scrambled data is programmed into a multi-level cell (MLC) portion of the flash memory.

48. The method of claim 46, wherein the shaped data has a same number of bits as the data.

49. The method of claim 48, wherein shaping the data is performed via a block transformation.

50. The method of claim 46, wherein scrambling the encoded shaped data includes providing the encoded shaped data to an input of a scrambler and wherein the scrambled data is provided at an output of the scrambler.

51. The method of claim 50, wherein the scrambler is in a controller external to a die that includes the flash memory.

52. The method of claim 50, wherein the scrambler is in a die that includes the flash memory.

53. The method of claim 46, wherein the scrambled data is programmed into a multi-level cell (MLC) portion of the flash memory, and wherein each logical page of the MLC portion is associated with a distinct scrambling word.

54. The method of claim 46, wherein the scrambled data is programmed into a multi-level cell (MLC) portion of the flash memory, and wherein multiple logical pages within a same word line of the MLC portion are associated with a common scrambling word.

55. A data storage device comprising:
a flash memory; and
a controller configured to:
   shape data to be stored to the flash memory to generate shaped data;
   encode the shaped data to generate encoded shaped data;
   program scrambled data into the flash memory, wherein the encoded shaped data is scrambled to generate the scrambled data;
   read the scrambled data from the flash memory;
   descramble scrambled data that is read from the flash memory to generate a representation of a codeword;
   determine a shaping level of the representation of the codeword; and
   determine a soft metric for decoding based on the representation of the codeword and based on the shaping level.

56. The data storage device of claim 55, wherein the flash memory includes a single level cell (SLC) portion and a multi-level cell (MLC) portion, wherein the controller is configured to program the encoded shaped data into the SLC portion, wherein the encoded shaped data is read from the SLC portion and scrambled to generate the scrambled data, and wherein the scrambled data is programmed into the MLC portion.

57. The data storage device of claim 55, wherein the shaped data has a same number of bits as the data.

58. The data storage device of claim 57, wherein shaping the data is performed via a block transformation.

59. The data storage device of claim 55, wherein scrambling the encoded shaped data includes providing the encoded shaped data to an input of a scrambler, and wherein the scrambled data is provided at an output of the scrambler.

60. The data storage device of claim 59, wherein the scrambler is in the controller and external to a die that includes the flash memory.

61. The data storage device of claim 59, wherein the scrambler is in a die that includes the flash memory.

62. The data storage device of claim 55, wherein the scrambled data is stored to a multi-level cell (MLC) portion of the flash memory, and wherein each logical page of the MLC portion is associated with a distinct scrambling word.

63. The data storage device of claim 55, wherein the scrambled data is stored to a multi-level cell (MLC) portion of the flash memory, and wherein multiple logical pages within a same word line of the MLC portion are associated with a common scrambling word.

* * * * *

UNITED STATES PATENT AND TRADEMARK OFFICE
CERTIFICATE OF CORRECTION

PATENT NO. : 9,135,155 B2  
APPLICATION NO. : 13/690275  
DATED : September 15, 2015  
INVENTOR(S) : Eran Sharon et al.

Page 1 of 1

It is certified that error appears in the above-identified patent and that said Letters Patent is hereby corrected as shown below:

IN THE CLAIMS (Column 24, Line 28) "volatile memory to determine additional soft hits in response" should be --volatile memory to determine additional soft bits in response--.

(Column 26, Line 55) "The method of claim 38, wherein, determining the soft" should be --The method of claim 38, wherein determining the soft--.

(Column 26, Line 67) "to the hit representation; and" should be --to the bit representation; and--.

(Column 27, Line 6) "determine a hit representation corresponding to a bit in a" should be --determine a bit representation corresponding to a bit in a--.

(Column 27, Line 62) "The method of claim 46, farther comprising, prior to" should be --The method of claim 46, further comprising, prior to--.

Signed and Sealed this  
Twenty-second Day of March, 2016

Michelle K. Lee  
*Director of the United States Patent and Trademark Office*